United States Patent [19]

Littlejohn

[11] Patent Number: 5,366,281
[45] Date of Patent: Nov. 22, 1994

[54] METHOD OF INITIALIZING A BRAKE ACTUATOR

[75] Inventor: Deron C. Littlejohn, Middletown, Ohio

[73] Assignee: General Motors Corporation, Detroit, Mich.

[21] Appl. No.: 196,351

[22] Filed: Feb. 14, 1994

[51] Int. Cl.⁵ .............................................. B60T 13/74
[52] U.S. Cl. ........................................ 303/3; 188/156;
188/158; 188/181 T; 303/15; 303/20; 303/112
[58] Field of Search ..................... 303/3, 112, 20, 101,
303/93, 91, 100, 15–18, 13–14, 115.2, 103–110,
9.62, 9.71; 180/197, 165, 65.1–65.8; 318/375,
376; 188/162, 156, 158, 159, 106 F, 106 P, 181
T; 364/426.01, 426.02, 426.03

[56] References Cited

U.S. PATENT DOCUMENTS

| Re. 33,663 | 8/1991 | Kade et al. ............... | 364/426.02 |
|---|---|---|---|
| 4,270,806 | 6/1981 | Venkaperumal et al. ............ | 303/3 |
| 4,423,363 | 12/1983 | Clark et al. ................ | 318/375 |
| 4,425,005 | 1/1984 | Warwick ................... | 303/3 |
| 4,550,372 | 10/1985 | Kahrs ...................... | 364/426 |
| 4,671,577 | 6/1987 | Woods ..................... | 303/3 |
| 4,673,225 | 6/1986 | Kade ....................... | 303/100 |
| 4,755,945 | 7/1988 | Kade et al. ................ | 364/426 |
| 4,783,127 | 11/1988 | Kade et al. ................ | 303/100 |
| 4,828,334 | 5/1989 | Salman .................... | 303/100 |
| 4,850,650 | 7/1989 | Eckert et al. ............. | 303/9.62 |
| 4,908,553 | 3/1990 | Hoppie et al. ............. | 318/382 |
| 4,962,969 | 10/1990 | Davis ..................... | 303/3 |
| 4,979,391 | 12/1990 | Drake et al. .............. | 73/129 |
| 5,000,297 | 3/1991 | Shaw et al. ............... | 188/156 |
| 5,024,299 | 6/1991 | Shaw et al. ............... | 188/156 |
| 5,099,186 | 3/1992 | Rippel et al. ............. | 318/803 |
| 5,112,116 | 5/1992 | Mikhaeil-Boules et al. ...... | 303/115 |
| 5,139,315 | 8/1992 | Walenty et al. ............ | 303/95 |
| 5,148,883 | 9/1992 | Tanaka et al. ............. | 180/165 |
| 5,162,707 | 11/1992 | Joseph .................... | 318/60 |
| 5,178,403 | 1/1993 | Kemner et al. ............. | 280/423.1 |
| 5,246,283 | 9/1993 | Shaw et al. ............... | 303/3 |
| 5,253,929 | 10/1993 | Ohori ..................... | 303/3 |

FOREIGN PATENT DOCUMENTS

| 280478A2 | 2/1988 | European Pat. Off. . |
|---|---|---|
| 418995A1 | 3/1990 | European Pat. Off. . |
| 457594A2 | 5/1991 | European Pat. Off. . |
| 488163A2 | 11/1991 | European Pat. Off. . |
| 531200A2 | 1/1992 | European Pat. Off. . |
| 508367A2 | 4/1992 | European Pat. Off. . |
| 527065A1 | 6/1992 | European Pat. Off. . |
| 3608370A1 | 3/1986 | Germany . |
| 4124496A1 | 7/1991 | Germany . |
| 1590473 | 6/1981 | United Kingdom . |
| 1717429A1 | 4/1990 | U.S.S.R. . |
| 92/15469 | 9/1992 | WIPO . |

Primary Examiner—Douglas C. Butler
Attorney, Agent, or Firm—Anthony L. Simon

[57] ABSTRACT

A method of controlling a brake system comprising the steps of: (i) receiving a brake command from a brake pedal; (ii) responsive to the received command, applying full power to the brake actuator for a first time period after the brake command is received; (iii) after the first time period, applying power to the brake actuator responsive to the brake command and a first gain factor for a second time period; (iv) after the second time period, applying power to the brake actuator responsive to the brake command and a second gain factor, wherein the second gain factor is less than the first gain factor, wherein the brake actuator is initialized responsive to the brake command.

3 Claims, 19 Drawing Sheets

COPYRIGHT-
GENERAL MOTORS
CORPORATION

COPYRIGHT-
GENERAL MOTORS
CORPORATION

METHOD OF INITIALIZING A BRAKE ACTUATOR

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to vehicle brake controls. The subject of this invention relates to the subject of co-pending patent applications, U.S. Ser. Nos. 08/195,004, 08/195,225, 08/196,026 and 08/195,242, each filed Feb. 14, 1994 concurrently with this application, assigned to the assignee of this invention, and having a disclosure that is incorporated herein by reference.

BACKGROUND OF THE INVENTION

Typically, electric vehicles drive electric motors based on electric power stored in batteries having a limited power storage capability.

SUMMARY OF THE PRESENT INVENTION

Advantageously, this invention provides a method of controlling an electric brake system. Advantageously this invention provides control of a brake system suitable for use in an electric vehicle. Advantageously, this invention provides control for an electric brake that provides initiation of the electric brake responsive to the vehicle operator's braking effort.

Advantageously, according to this invention, responsive to a soft depression of the brake pedal by the vehicle operator, the brake actuators have a soft initialization. Advantageously according to this invention, responsive to a hard depression of the brake pedal by the vehicle operator (i.e., slamming on the brakes), the brake actuators have a spiked or very fast initialization. Advantageously, this invention eliminates an overly hard initialization for slow or soft operator brake apply while also preventing a lagging initialization for fast or hard operator brake applies.

Advantageously, according to this invention, the initialization and activation of the brake actuators is a three-step process. When a brake command is first received, the brake actuators are commanded full on for a first predetermined time period. After the first predetermined time period, the motors are commanded (voltage control) responsive to the brake pedal input and a very high gain factor for a second time period to affect speed control of the motors. During the first two time periods, the brake pads or shoes are quickly moved close to and/or in contact with the rotor or drum when braking is requested, and in a manner responsive to the magnitude of the braking request. From that point on, the brake motors are commanded according to the brake pedal input and normal brake gain factors. Thus the motors are provided with full power for the first predetermined time period, high gain output for the second predetermined time period, and normal gain output for the remainder of the braking application, providing initialization in response to operator braking effort.

Structurally, the apparatus of this invention comprises an input device for receiving a brake input, a brake actuator and a control device coupled to the input device and the brake actuator and receiving brake commands from the input device and providing actuator commands to control current and voltage to the brake actuator, wherein, when a brake command is first received from the input device, the controller outputs, for a first predetermined time period, a brake torque command to the brake actuator commanding maximum current to the actuator, wherein, after the first predetermined time period, the controller outputs, for a second predetermined time period, a brake torque command to the brake actuator commanding voltage to the actuator responsive to the brake command and a first gain factor, and wherein after the second predetermined time period, the controller outputs the brake torque command to the brake actuator commanding current to the actuator responsive to the brake command and a second gain factor, wherein the first gain factor is greater than the second gain factor and wherein brake initialization is responsive to the brake input.

Advantageously, the method of this invention comprises the steps of: (i) receiving a brake command from a brake pedal; (ii) responsive to the received command, applying full power to a brake actuator for a first time period after the brake command is received; (iii) after the first time period, applying power to the brake actuator responsive to the brake command and a first gain factor for a second time period; (iv) after the second time period, applying power to the brake actuator responsive to the brake command and a second gain factor, wherein the second gain factor is less than the first gain factor, wherein the brake actuator is initialized responsive to the brake command.

A more detailed description of this invention is set forth below.

DETAILED DESCRIPTION OF THE INVENTION

Figure 1:
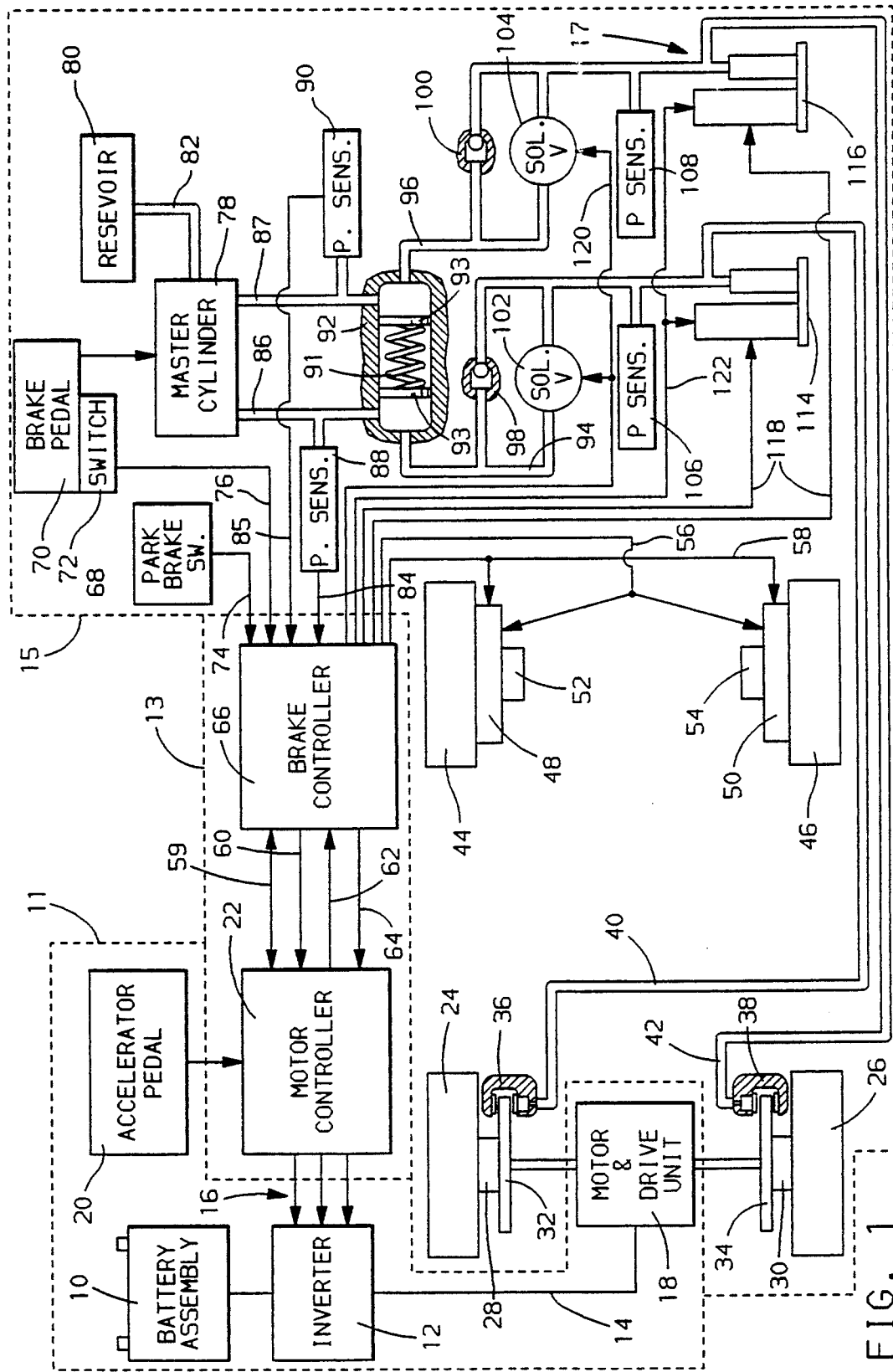
FIG. 1 illustrates schematically an example vehicle including the brake system according to this invention.

Referring to FIG. 1, an example vehicle for implementing the brake system of this invention comprises electric motor propulsion system 11, brake system 15 and control unit 13. The electric motor propulsion system 11 includes battery pack 10, inverter 12 (for use with AC motors), accelerator pedal 20 and electric motor 18. Brake system 15 includes brake pedal 70, hydraulic braking system 17 and electric drum brakes 48 and 50. Control unit 13 includes motor controller 22 for controlling the propulsion system 11 and brake controller 66 for controlling brake system 15.

In the propulsion system 11, battery pack 10 supplies power to the vehicle systems and power invertor 12 responds to motor controller 22 for controlling electric motor 18. Motor 18 provides both drive force to vehicle drive wheels 24 and 26 and regenerative braking by generating power, when commanded, and coupling the generated power to battery pack 10, providing braking torque to wheels 24 and 26. An example motor drive and recharge system, suitable for use as inverter 12 and motor 18 (assuming a three phase AC motor 18 is used), is set forth in U.S. Pat. No. 5,099,186, assigned to the assignee of this invention and having a disclosure that is incorporated herein by reference.

Accelerator pedal 20 provides an accelerator command to motor controller 22, which responsively controls invertor 12 via command line 16 to provide power to motor 18 and thereby provide motive drive force to drive wheels 24 and 26.

In brake system 15, hydraulic brake system 17 comprises master cylinder 78, hydraulic lines 40, 42, 86, 87, 94 and 96, accumulator 92, actuators 114 and 116, solenoid valves 102 and 104, brake calipers 36 and 38 and disc brakes 32 and 34. Brake controller 66 responds to operator depression of brake pedal 70, providing brake information to motor controller 22 and controlling the hydraulic brake system, including solenoid valves 102 and 104, actuators 114 and 116, and electric rear brakes 48 and 50. Bypass valves 98 and 100 allow excess pressure from actuators 114 and 116 to flow to accumulator 92. Brake controller 66 also monitors the various rotational speeds of vehicle wheels 24, 26, 44 and 46 through speed sensors 28, 30, 52 and 54.

The battery pack 10 can be any battery pack or rechargeable electric power storage device suitable for use in an electric vehicle. Power invertor 12 is used when motor 18 is one or more AC motors. If one or more DC drive motors are used, power invertor 12 is not necessary and may be replaced with an appropriate DC motor controller of a type well known to those skilled in the art.

The motor drive unit 18 may be a single drive motor driving both wheels 24 and 26, may be two motors connected back-to-back driving wheels 24 and 26, or may be a two or more motors with each motor incorporated into each wheel assembly. Additionally, the motors may be AC motors or DC motors, including one or more brushless DC motors.

The motor controller 22 may be any microcomputer based controller suitable for providing control commands to the type of motor used. Accelerator pedal 20 responds to operator foot commands in a conventional manner, providing output signals through an actuator for converting pedal position to an electric signal. Preferably, the actuator comprises redundant potentiometers that provide two or more pedal position signals to motor controller 22. This type of accelerator pedal may be easily implemented by those skilled in the art.

Brake controller 66 may be any microprocessor based controller suitable for providing output commands to actuators 114 and 116, rear brakes 48 and 50 and valves 102 and 104 and for receiving input signals from the parking brake switch 68, brake pedal switch 72 and pressure transducers 88, 90, 106 and 108.

The brake pedal 70 may be a conventional brake pedal and switch 72 may be a conventional brake pedal switch of a known type commonly used to turn on rear brake lights (not shown). The master cylinder 78 is a conventional master cylinder with a reservoir 80. The accumulator 92 has expansion chambers on either side allowing accumulation of hydraulic fluid by compression of center spring 91. Pressure transducers 88 and 90 may be any suitable type of transducers for providing signals indicative of the pressure in brake lines 86 and 87. Valves 102 and 104 are solenoid valves normally opened and being controllable to isolate hydraulic lines 94 and 96 from lines 40 and 42, respectively, when a command is received through command line 120.

Actuators 114 and 116 may be existing anti-lock brake actuators with the requirement that the actuators be capable to independently provide pressure in hydraulic lines 40 and 42 responsive to commands on lines 118. Actuators 114 and 116 are of the type set forth in U.S. Pat. Nos. 4,850,650 and Re. 33,663, both assigned to the assignee of this invention and both having disclosures that are incorporated herein by reference.

Brake calipers 36 and 38 are conventional hydraulic disc brake calipers for use with conventional brake discs 32 and 34. An example of the front brake system is set forth in U.S. patent application Ser. No. 07/942,015, filed Sep. 8, 1992, assigned to the assignee of this invention, and having a disclosure that is incorporated herein by reference.

Electric brakes 48 and 50 for rear wheels 44 and 46 may be any suitable electric brake. Example electric drum brakes are set forth in U.S. Pat. Nos. 5,000,297 and 5,024,299, both assigned to the assignee of this invention and both having disclosures that are incorporated herein by reference. Examples electric drum brakes are also set forth in U.S. patent applications Ser. No. 07/963,179, filed Oct. 19, 1992, and Ser. No. 07/720,087, filed Jan. 24, 1991, both assigned to the assignee of this invention and both having disclosures that are incorporated herein by reference.

Speed sensors 28, 30, 52 and 54 are well known to those skilled in the art and may be of the type commonly used in anti-lock brake systems.

In the vehicle shown, the propulsion system may be controlled in any known or useful manner suitable for the vehicle shown, including control to provide regenerative braking and blending of the regenerative braking with friction braking by the brake system in a known manner. Additionally, a non-compete function may be implemented where the accelerator pedal input and brake pedal inputs are summed in a known manner and do not compete for torque control of the same wheel.

According to this invention, the brake system shown runs a diagnostic test either with every vehicle start-up or at predetermined intervals to determine the functionality of the hydraulic brake actuators 114 and 116 or the remainder of the front hydraulic brake system. In the event that the front brake system is determined not to be completely operational, the actuators 114 and 116 are shut down and valves 102 and 104 are set in the open position. In this state, the front brake system acts as a manual braking system.

When the actuators 114 and 116 are operational, they provide a boost to the front brake system, for example, on the order of 5 to 1. When the actuators 114 and 116 are not operational, they do not provide a boost to the front brake system. To properly balance the entire vehicle brake system, according to this invention, the remainder of the vehicle braking devices, such as the rear electric drum brakes and regenerative braking from the electric motor, if provided, are scheduled from the front brake system. According to this invention, the scheduling of the gains of the vehicle brake systems depends upon the operational status of the front brake actuators to achieve, through gain shifting, appropriate balancing of the vehicle brake systems with respect to each other.

Figure 2:
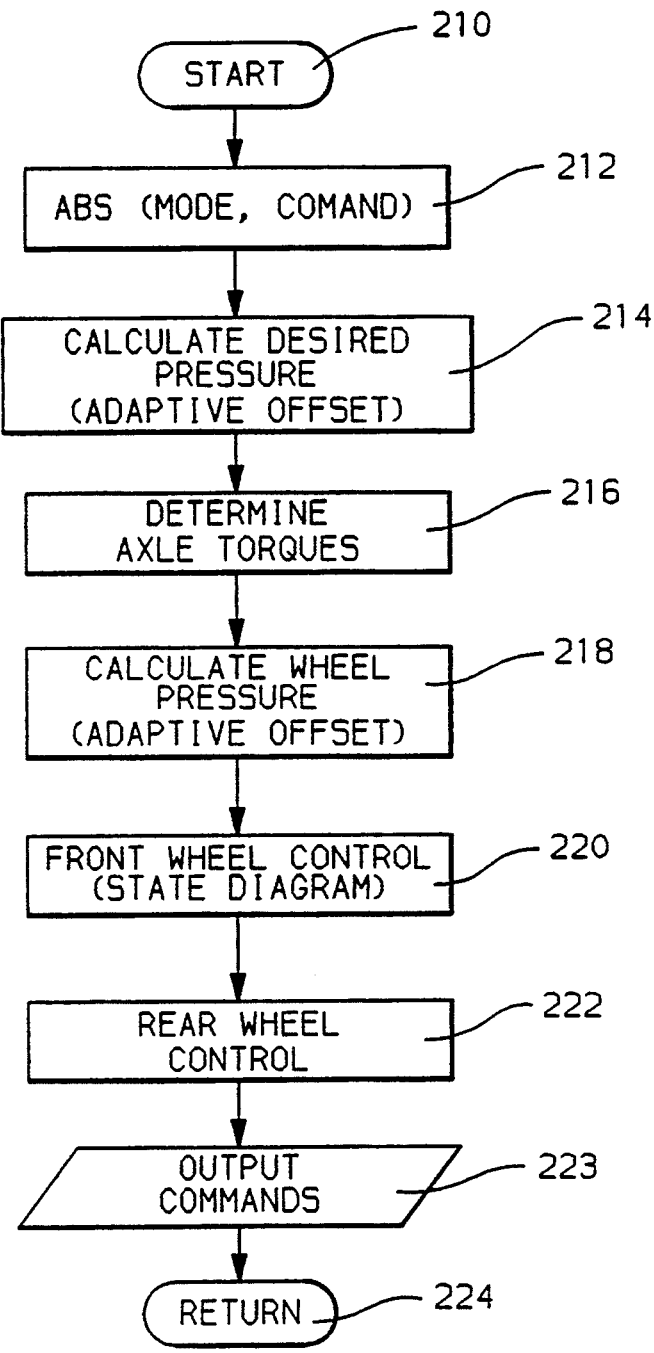
FIGS. 2, 3, 4, 5a, 5b, 6, 7a, 7b, 8 and 9 comprise flow diagrams for an example brake control flow routine according to this invention.

Referring now to FIG. 2, a general flow of the brake controller flow routine according to this invention is illustrated starting at block 210 and moving to block 212, where an ABS control algorithm (optional) is run. In general, the ABS control algorithm is a typical anti-lock brake system control algorithm of a type well known to those skilled in the art that: (a) determines whether or not the vehicle is in anti-lock braking mode (setting a flag in response to this determination) and (b) if so, determines the anti-lock braking torque command for each wheel.

The routine then moves to block 214 where a subroutine is run to calculate desired brake pressure responsive to operator depression of the brake pedal and also an adaptive offset routine to continuously determine the offset for master cylinder hydraulic line pressure sensors (i.e., sensors 88, 90, FIG. 1) when braking is not applied. The routine then moves to block 216 where a subroutine determines the mount of regeneration to be requested of the front motor controller and the front and rear brake torque commands. After block 216, the routine moves to block 218 where a subroutine adaptively determines the offsets for the hydraulic brake line pressure sensors (i.e., for sensors 106, 108, FIG. 1).

After block 218, the routine moves to block 220, where a subroutine runs the front wheel brake actuator control routines. At block 222, a rear wheel brake control is implemented. At block 223, the front and rear actuator commands are output to control the front and rear brake actuators. The controller then exits the main flow routine at block 224.

Figure 3:
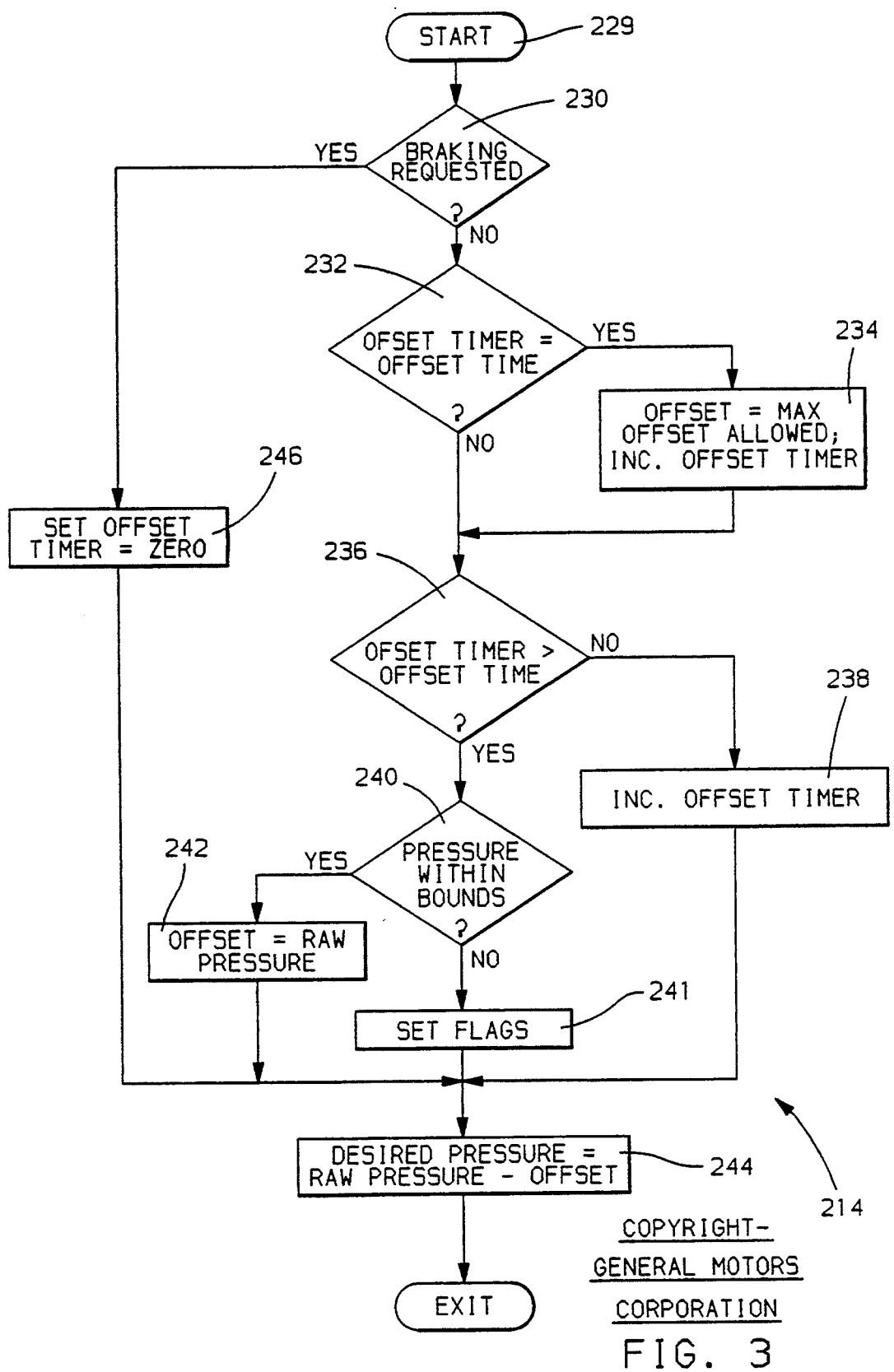

Referring now to FIG. 3, the subroutine for calculating the desired pressure and the adaptive offsets for the master cylinder pressure sensors begins at block 229. At block 230, the routine determines if braking is requested in response to either: (a) a sensed depression of the brake pedal via the brake switch or (b) both master cylinder pressure sensors provide output values higher than their set point values, indicating brake pedal depression. If braking is requested, as determined by either one of these tests, the routine moves to block 246 where the offset timer is set to zero and then to block 244 where the signal DESIRED PRESSURE for each sensor is set equal to the signal RAW PRESSURE from each pressure sensor subtracted by the sensor offset value stored in memory.

The offset for each sensor is initially set to the maximum allowed value and, when no braking is or has been requested for a predetermined time period, is continuously updated in the part of the routine indicated by blocks 232–242.

More particularly, if at block 230 braking was not requested, the routine moves to block 232 where the OFFSET TIMER is compared to the value OFFSET TIME. OFFSET TIMER keeps track of the amount of time since braking was last requested. (Note: When braking is requested, block 246 resets the offset timer to zero.) The predetermined value of OFFSET TIME sets the time period for which no braking must be applied before the offset is updated. If at block 232 the offset timer is not equal to the offset time, the routine moves to block 236. At block 236, the routine determines if OFFSET TIMER is greater than OFFSET TIME. If not, the routine moves to block 238 where OFFSET TIMER is incremented and continues to block 244.

If at block 232 the offset timer is equal to the offset time, the adaptive updating of the sensor offsets begins at block 234 where the offset for each sensor is set to the maximum offset allowed and OFFSET TIMER is incremented. At block 236, OFFSET TIMER is now greater than OFFSET TIME so the routine continues to block 240 where it compares the pressures from both of the master cylinder pressure sensors (88 and 90) and runs a simple boundary test. If both sensors are within a predetermined range of each other, if both sensor outputs are below the highest allowed offset pressure and if both sensor outputs are above the lowest allowed offset pressure, this test is passed. If not, the routine maintains the offsets at the previously determined values and continues to block 241, where the routine sets appropriate flags indicating a diagnostic failure, corresponding to the pressure that is out of bounds. The routine then continues to block 244.

If the pressure bounds test is passed at block 240, the routine moves to block 242 where the offset for each sensor 88, 90 is updated equal to the read signal, RAW PRESSURE, from each master cylinder pressure sensor 88, 90. Thus, at block 244, the signal DESIRED PRESSURE for each of the master cylinder brake lines is determined responsive to the raw pressure of each sensor 88, 90 and the offset of each sensor 88, 90.

Accordingly, then, this invention provides adaptive offset updating to the brake system pressure sensors. Implementing the adaptive updating routine set forth above, this invention controls the hydraulic brake system including pressure transducers for outputting brake pressure signals responsive to brake pedal depression and indicative of operator-desired braking. When the brake pedal is depressed, a brake command is determined in response to the pressure transducer output and a stored offset value. When the brake pedal is not depressed, a timer commences running.

If, while the timer is running, the brake pedal is depressed, the timer is reset and the braking is controlled as indicated above. If the timer times out before the brake pedal is depressed again, the pressure transducer signals are monitored and compared to predetermined limit values indicative of an acceptable range of output values when the pedal is not depressed. If the pressure transducer signals are within the predetermined limit values, the stored offsets are updated to equal the present pressure transducer output signals. Otherwise, if the pressure transducer signals are not within the predetermined limit values, the offsets are not updated. Thus, this invention provides updates to the brake line transducer signals during periods of no brake pedal depression, accounting for aging of the transducers, and change of environment, i.e., elevation above sea level, which may affect the transducer outputs.

Figure 4:
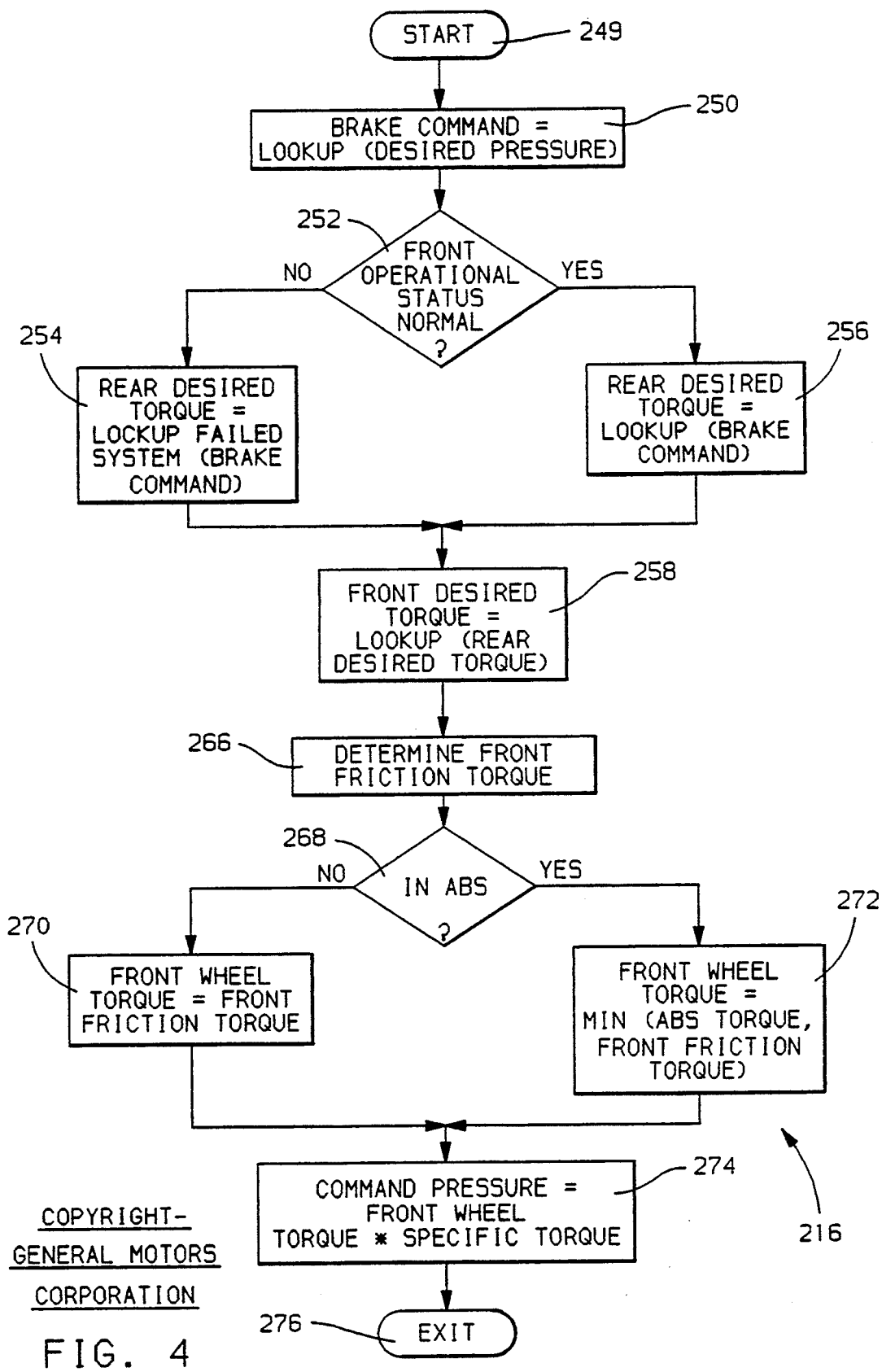

Referring now to FIG. 4, the flow diagram illustrated comprises the steps the controller takes in determining the brake torque command, the front and rear brake torque commands, the retard request provided to the motor controller and the front friction brake commands. The subroutine starts at block 249 and moves to block 250 where the signal BRAKE COMMAND (referred to as brake torque command above), representative of total torque required to slow the vehicle down in response to the driver requested braking, is retrieved from a look-up table in memory in response to the signal DESIRED PRESSURE (the greater of the values for the two master cylinder pressure lines is used). Typically, this look-up table performs the function:

*BRAKE COMMAND=DESIRED PRESSURE\*(1/SPECIFIC TORQUE)* where SPECIFIC TORQUE is a constant predeterminable for the particular brake system by one skilled in the art.

At block 252, the routine checks to determine if any errors are present in the front brake system. Error may be determined by implementation of a standard ABS diagnostics routine known to those skilled in the an that tests the wheel speed sensors for open circuits, short circuits, jitter, etc. If any of these known tests fail, the ABS function is disabled and the ABS indicator light in the instrument panel is illuminated. The known diagnostics also include standard actuator tests, which check for open and short circuits, proper voltage levels, movement slip, nut test and apply/release times too long, etc. If any of these known tests fail, the corresponding channel is disabled and the opposite rear wheel brake is disabled (in a diagonal split control).

Example tests are set forth in copending Applications, Attorney Docket Nos. G-9561 and H-168690.

The pressure sensor tests check for open circuits and shorts by sensing the line voltages, and compare the offsets to predetermined limits. If one of the master cylinder sensors 88 and 90 fails the test, the other sensor is used. If one of the actuator sensors 106, 108 fails, the corresponding actuator, and diagonal rear actuator are shut down.

If the communications link between the brake controller and motor controller fails, the regenerative braking function, if implemented, is disabled. If there are dual system failures, instead of a diagonal split system, both front actuators are disabled and the system is run as a manual front system, with rear actuators operational unless a shut down is required of the rear actuators.

Testing of the rear brake actuators includes known testing methods on the rear wheel speed sensors and actuators. In general, any one or both of the rear brake actuators may be disabled at any time without adversely affecting front braking performance.

If there are errors in both actuators, the front brake system is driven in manual mode as a manual system. In manual mode, there is no power boost provided by the front actuators to aid in braking. Regenerative braking may or may not be implemented, depending upon the system. As indicated above, depending upon the state of the rear brakes, the rear brake actuators may or may not be activated. The braking response in manual mode is similar to the response of a conventional braking system in an internal combustion engine vehicle in which the vacuum boost has been disabled.

If only one actuator has an error, the brake system is run as a diagonal split system. The actuator with the error is shut down and the diagonal rear actuator is shut down (by setting the actuator commands to zero). In an alternative implementation, instead of running as a diagonal split system, the system may shut down both front actuators in response to an error in either front actuator.

If the system is in manual mode, the routine moves to block 254, where the signal REAR DESIRED TORQUE is retrieved from a look-up table in response to BRAKE COMMAND. If the front brake actuators are operational at block 252, the system is in power mode and the routine moves to block 256, where the signal REAR DESIRED TORQUE is retrieved from a second look-up table in response to BRAKE COMMAND.

The first look-up table used at block 254 represents a lower gain factor for the signal REAR DESIRED TORQUE than the second look-up table used at block 256. Thus, advantageously according to this invention, in the power mode where the front brake actuators are operational, the rear brakes have a higher gain and in manual mode where the front brake actuators are not operational, the rear brakes have a lower gain.

Advantageously, according to this invention as described above, a brake torque command is determined in response to operator depression of the brake pedal according to a selected gain factor. If the system is in power mode, i.e., the hydraulic brake actuators are operational, a first gain factor is selected. If the system is in manual mode, i.e., both the hydraulic brake actuators are not operational, a second gain factor is selected, wherein the first gain factor is greater than the second gain factor. The brake torque command is then determined in response to the selected gain factors. Thus, when the rear brake commands are determined, which are determined either directly or indirectly in response to the selected gain, they will be scaled properly for either power braking mode or manual braking mode. In the electric vehicle system that uses regenerative braking, the retard request may be determined either directly or indirectly in response to the selected gain factors, and thus will also be properly scaled for either power or braking mode.

Referring again to FIG. 4, the routine continues to block 258 where the signal FRONT DESIRED TORQUE is retrieved from another look-up table in response to the signal REAR DESIRED TORQUE. Note that regenerative braking may be determined in response to the FRONT DESIRED TORQUE signal, and, thereby, gain shifting of the regenerative braking command is accounted for.

The routine then moves to block 266 where the FRONT FRICTION TORQUE command is determined. Determination of this command depends upon the system implementation. In an electric vehicle with regenerative brake blending, the front friction torque command may be determined as the difference between the FRONT DESIRED TORQUE and the retard achieved through the motor control, i.e., brake pedal and accelerator pedal summing and regenerative braking achieved. If the system is in ABS mode, regenerative braking may be disabled.

Again at block 268, the ABS mode flag is checked. If the system is not in ABS mode, the signal FRONT WHEEL TORQUE is set equal to FRONT FRICTION TORQUE. If the system is in the ABS mode, at block 272, FRONT WHEEL TORQUE is set equal to the minimum of the ABS torque command and FRONT FRICTION TORQUE. At block 274, the pressure command for the front brake hydraulic lines, COMMAND PRESSURE, is set equal to FRONT WHEEL TORQUE times SPECIFIC TORQUE. After determining COMMAND PRESSURE, the routine exits at block 276.

Control of the front brake actuators responsive to COMMAND PRESSURE is set forth in the above mentioned commonly assigned copending applications, Attorney Docket Nos. G-9561 and H-168690. Alternatively, any suitable type of front brake control system may be used in the alternative.

Figure 5A:
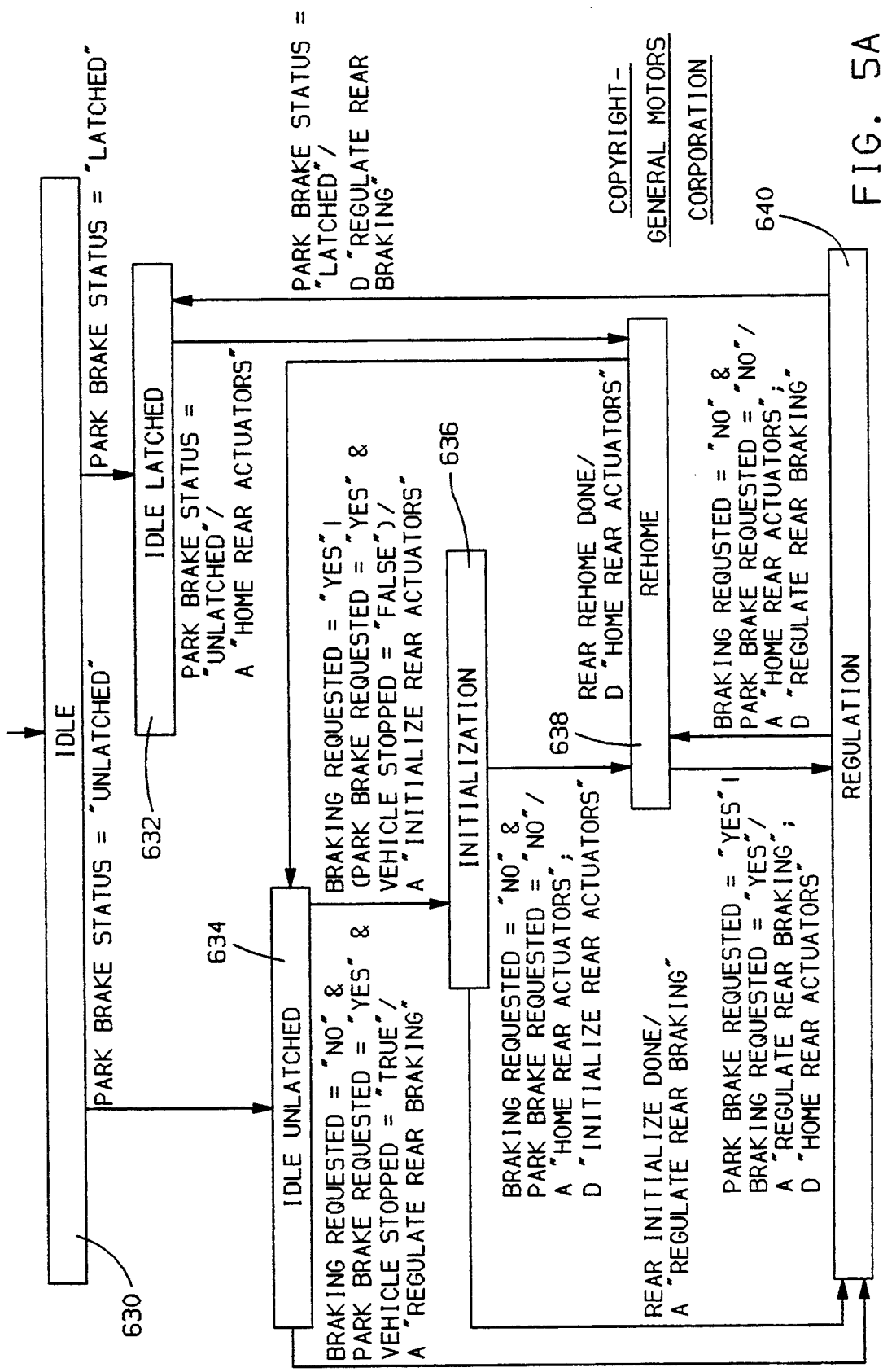
Figure 5B:
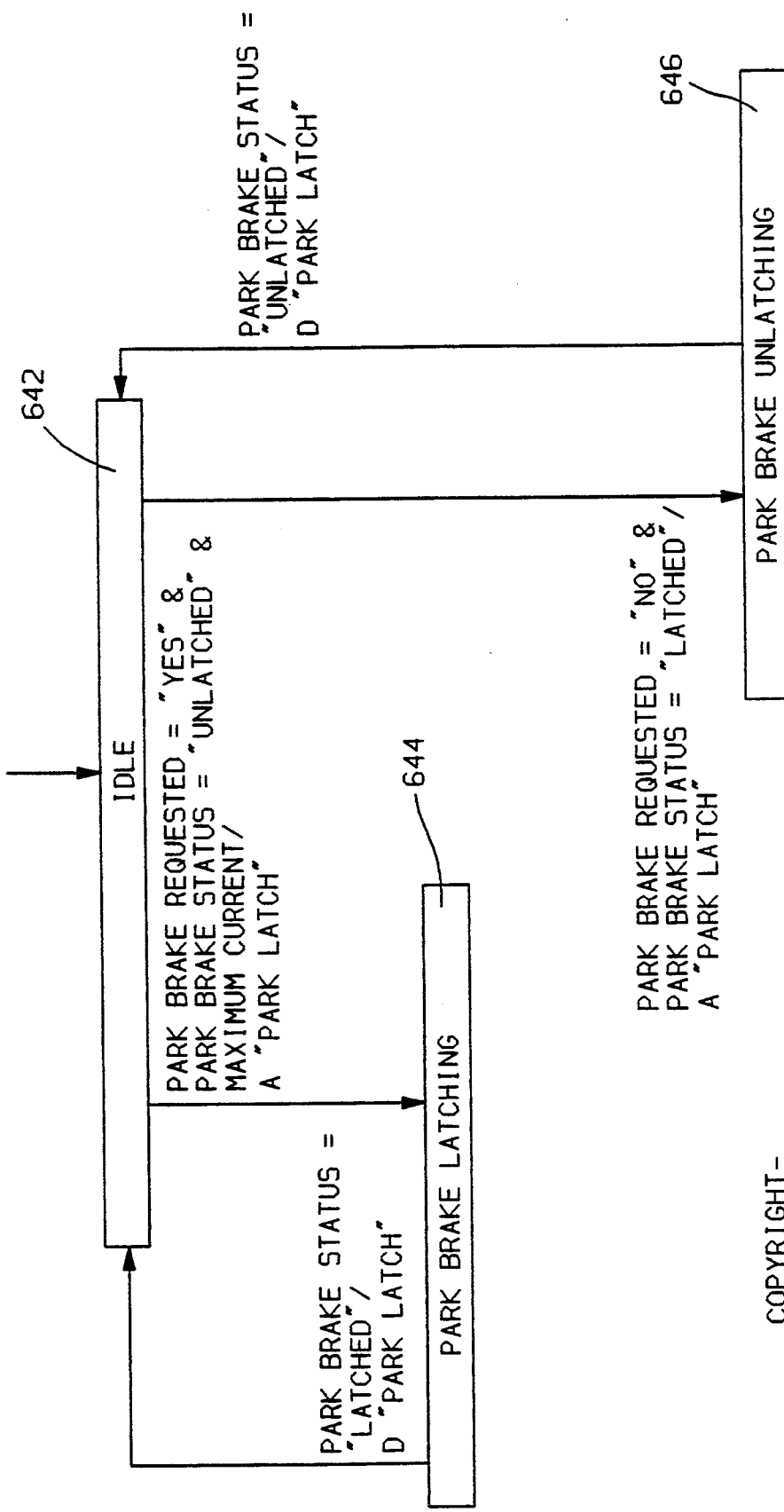

Referring now to FIGS. 5a and 5b, the control of the rear electric drum brakes is performed by a series of subroutines in the manner indicated in the rear wheel brake control state diagrams shown. In general, with each loop through the main control routine, only subroutines enabled according to the system state are run. Enabling and disabling appropriate subroutines is easily achieved by controlling a set of flags according to the criteria set forth herein. The states shown in FIG. 5a control the actuator motor that applies the brake shoes against the brake drum and the states shown in FIG. 5b control the parking brake latch, which either holds the brake shoes against the brake drums or releases the shoes.

Blocks 630, 632 and 634 comprise the IDLE state in which the rear actuators are idle with either the parking brake off, IDLE UNLATCHED, block 634 or the parking brake activated, IDLE LATCHED, block 632. In general, when in the IDLE UNLATCHED state 634, where the parking brake is not latched, the system remains in the IDLE UNLATCHED state 634 until either the parking brake is activated, at which point the system moves to the REGULATION state 640, or until braking is requested. The system determines that braking is requested either by a sensed depression of the brake pedal or by vehicle movement during a park brake request. When the system is in the IDLE UNLATCHED state 634 and braking is requested, the system moves to the INITIALIZATION state 636.

When the parking brake is activated and the vehicle is not moving, the system enters the REGULATION state 640 and activates the Regulate Rear Braking subroutine. In the REGULATION state 640, the system cycles the rear electric brakes by ramping up the electric brakes to move the shoes against the drum and activating the parking brake latch. The latch control system remains in IDLE state 642 until the shoes are controlled by the brake actuator to apply parking brake pressure against the brake drum. Once the shoes are moved to press against the brake drum, as indicated by the actuator current reaching the maximum level, the latch control system moves to the LATCHING state 644, where it activates the parking brake latch for each rear wheel. The latch control system then returns to IDLE state 642. After the parking brake is latched, a flag is set and the actuator control system moves from the REGULATION state 640, to the IDLE LATCHED state 632, disabling the Regulate Rear Braking subroutine.

The system remains in the IDLE LATCHED state 632 until the parking brakes are released, turning off the parking brake latch and setting an UNLATCHED flag. When unlatching the parking brake, the latch control system moves from IDLE state 642 to UNLATCHING state 646, where the brake is unlatched. Once the brake is unlatched, the latch control system returns to the IDLE state 642.

When this occurs, the actuator control system activates the subroutine Home Rear Actuators, moving the system into the REHOME state 638. In the REHOME state 638, a subroutine is run to rehome the rear electric drum brake actuators, moving the rear electric drum brake shoes to a position readying the rear brakes for the next brake application. If no braking is requested by the vehicle operator while the system is in the REHOME state 638, after the brakes are rehomed, the system returns to the IDLE UNLATCHED state 634.

As stated above, if the system is in the IDLE UNLATCHED state 634 and the parking braking is requested, the system moves to the REGULATION 640. If, in the REGULATION state, the parking brake is deactivated, the Regulate Rear Braking subroutine is disabled and the Home Rear Actuators subroutine is enabled, moving the system into the REHOME state 638. After the rehoming is completed and in the absence of a braking request, the system returns to the IDLE UNLATCHED state 634.

If, in the IDLE UNLATCHED state 634, braking is requested, the Initialized Rear Actuator subroutine is activated and the system moves to the INITIALIZATION state 636.

In the INITIALIZATION state 636, if braking requests cease so that neither braking nor the parking brake are requested, the Initialize Rear Actuators subroutine is disabled and the Home Rear Actuators subroutine is enabled, moving the system into the REHOME state 638. While in the INITIALIZATION state 636, the rear electric brakes are initialized according to this invention by firstly activating the rear actuators at full power for a first predetermined time period, secondly activating the rear electric brake actuators at a partial power responsive to operator brake pedal depression and a high gain factor for a second predetermined time period to thereby quickly move the brake pads close to the drums when braking is requested. Thereafter, normal braking is performed at a normal gain responsive to drive input, with the normal gain lower than the high gain.

Once the brakes are initialized and the braking request is still continued, an INITIALIZED flag is set and the Regulate Rear Braking subroutine is activated, moving the system into the REGULATION state 640.

When the system is in the REGULATION state 640 due to a braking request, the rear electric brake actuators are controlled responsive to the driver brake pedal input to maintain the desired brake pressure in the rear electric brakes. If in the REGULATION state 640, all brake commands cease, the system moves to the REHOME state 638, activating the Home Rear Actuators subroutine and deactivating the Regulate Rear Actuators subroutine.

The subroutines performed in each of the system states are described in more detail below with reference to FIGS. 6–16. The subroutine run in the idle states is not shown because of its simplicity. More particularly, in the idle states, the system generally takes no action on the actuator or latch, performs known diagnostics for motor actuators and brake systems, and waits for system inputs. In the IDLE UNLATCHED state 634, the system waits for park brake and brake commands. In the IDLE LATCHED state 632, the system monitors for a park brake unlatch command. In the latch control system, IDLE state 642 monitors for parking brake commands—latch and unlatch.

Figure 6:
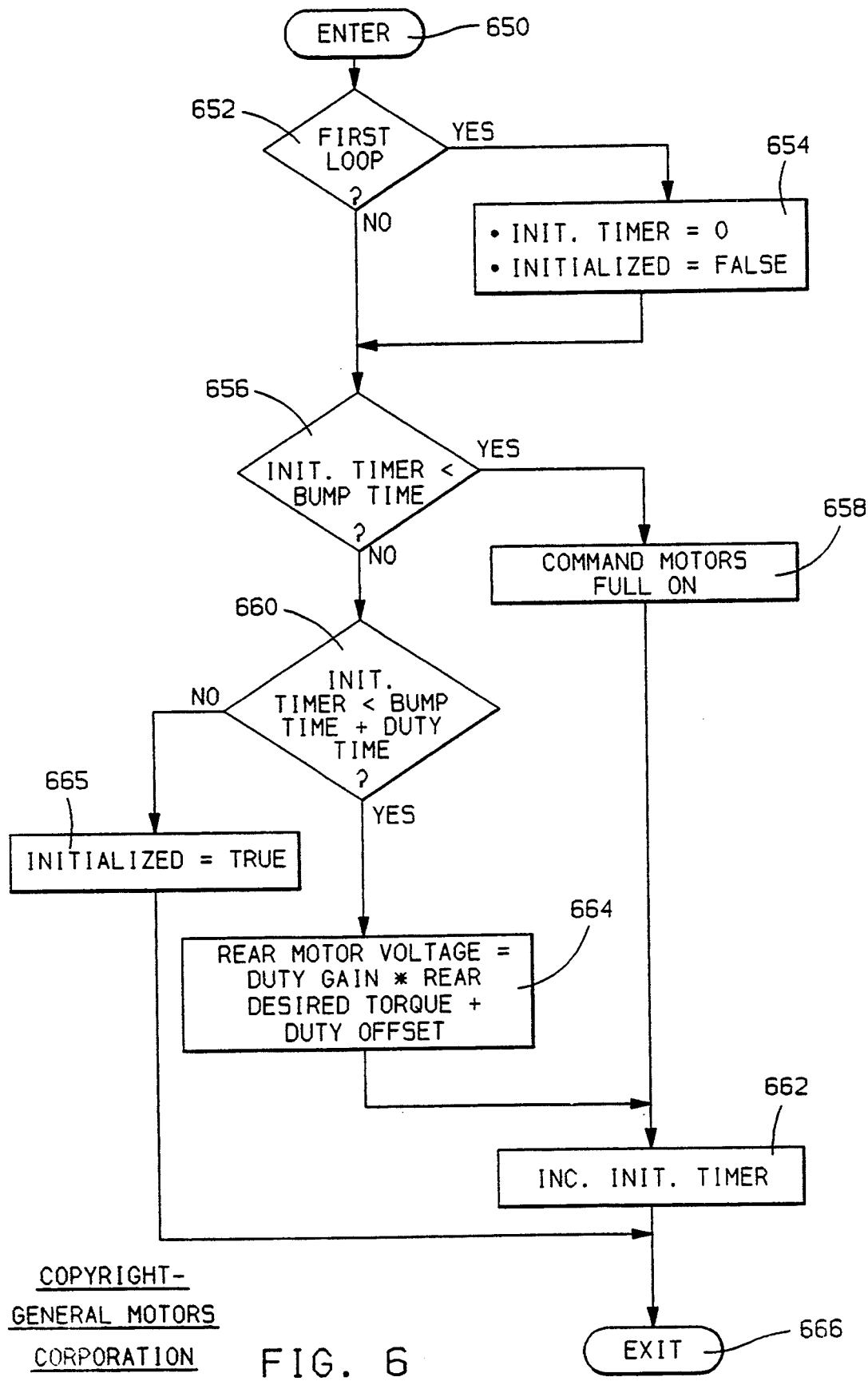

Referring now to FIG. 6, the Initialized Rear Actuators subroutine is shown and is activated by the setting of an appropriate flag when the system is in the INITIALIZATION state 636. The routine starts at block 650 and moves to block 652, where the routine checks to determine if this is the first loop through the initialize routine for the present brake request. If so, the variable INITIALIZE TIMER is reset and the INITIALIZED flag is set to false.

The routine then continues to block 656 where the variable INITIALIZE TIMER is compared to a predetermined value BUMP TIME. If INITIALIZE TIMER is less than BUMP TIME, the routine moves to block 658 where the rear brake actuator motors are commanded full on and then the routine continues to block 662. At block 662, the value for INITIALIZE TIMER is incremented and the routine is exited at block 666.

If, at block 656, INITIALIZE TIMER is not less than BUMP TIME, the routine moves to block 660 where the value of INITIALIZE TIMER is compared to a value BUMP TIME+DUTY TIME. If at block 660 the value of INITIALIZE TIMER is less than BUMP TIME+DUTY TIME, the routine moves to block 664 where the rear motor voltage is set according to the equation:

$$REAR\ MOTOR\ VOLTAGE = (DUTY\ GAIN * REAR\ DESIRED\ TORQUE) + DUTY\ OFFSET,$$

where DUTY GAIN is a high gain used during the period between BUMP TIME and DUTY TIME during initialization, and DUTY OFFSET is a predetermined value used to offset friction in the actuator. The routine then continues to block 662, where INITIALIZE TIMER is incremented and then exits at block 666.

If INITIALIZE TIMER is not less than BUMP TIME+DUTY TIME at block 660, the actuators are initialized. The routine moves to block 665, sets an INITIALIZED flag to true, indicating that the rear initialization is done, and exits at block 666. In response to the INITIALIZED flag set to true at block 665, the system deactivates the Initialize Rear Actuators subroutine and moves from the INITIALIZATION state 636 into the REGULATION state 640.

Thus, advantageously, according to this invention, the initialization and activation of the brake actuators as described herein is a three-step process. When a brake command is first received, the brake actuators are commanded full on for a first predetermined time period, referred to as the BUMP TIME (i.e., 15 ms). After the first predetermined time period, the motors are commanded responsive to the brake pedal input and a very high gain factor for a second time period, referred to as the DUTY TIME (i.e., 300 ms). From that point on, the brake motors are commanded according to the brake pedal input and normal brake gain factors. Thus the motors are provided with full power for the BUMP TIME, high gain output for the DUTY TIME and normal gain output for the remainder of the braking application.

Advantageously, according to this process, the driver's brake input is used to control the rear brake initialization. Thus, responsive to a soft depression of the brake pedal by the vehicle operator, the brake actuators have a softer initialization. Responsive to a hard depression of the brake pedal by the vehicle operator (i.e., slamming on the brakes), the brake actuators have a spiked or very fast initialization. Thus, advantageously, this invention eliminates an overly hard initialization for slow or soft operator brake apply while also preventing a lagging initialization for fast or hard operator brake applies.

It is recognized that the above described advantages of this invention are embodied, structurally, in an apparatus according to this invention comprising an input device for receiving a brake input, a brake actuator and a control device coupled to the input device and the brake actuator and receiving brake commands from the input device and providing actuator commands to control current and voltage to the brake actuator, wherein, when a brake command is first received, the controller outputs, for a first predetermined time period, a brake torque command to the brake actuator commanding maximum current to the actuator, wherein, after the first predetermined time period, the controller outputs, for a second predetermined time period, a brake torque command to the brake actuator commanding voltage to the actuator responsive to the brake command and a first gain factor, and wherein after the second predetermined time period, the controller outputs the brake torque command to the brake actuator commanding current to the actuator responsive to the brake command and a second gain factor, wherein the first gain factor is greater than the second gain factor wherein brake initialization is responsive to the brake input.

It is appreciated that the example of this invention described herein embodies the method of this invention comprising the steps of: (i) receiving a brake command from a brake pedal; (ii) responsive to the received command, applying full power to the brake actuator for a first time period after the brake command is received; (iii) after the first time period, applying power to the brake actuator responsive to the brake command and a first gain factor for a second time period; (iv) after the second time period, applying power to the brake actuator responsive to the brake command and a second gain factor, wherein the second gain factor is less than the first gain factor, wherein the brake actuator is initialized responsive to the brake command.

Figure 7A:
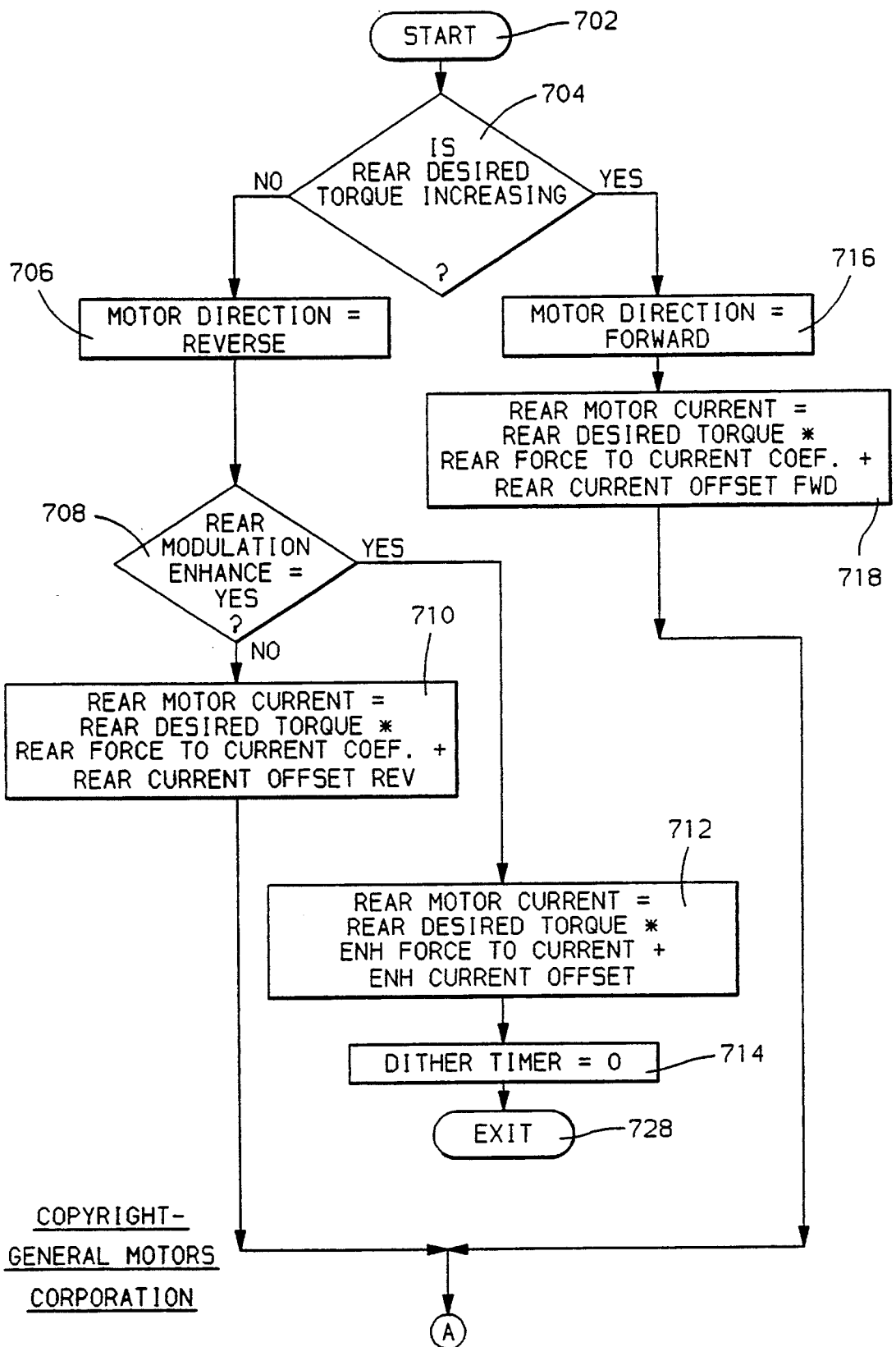
Figure 7B:
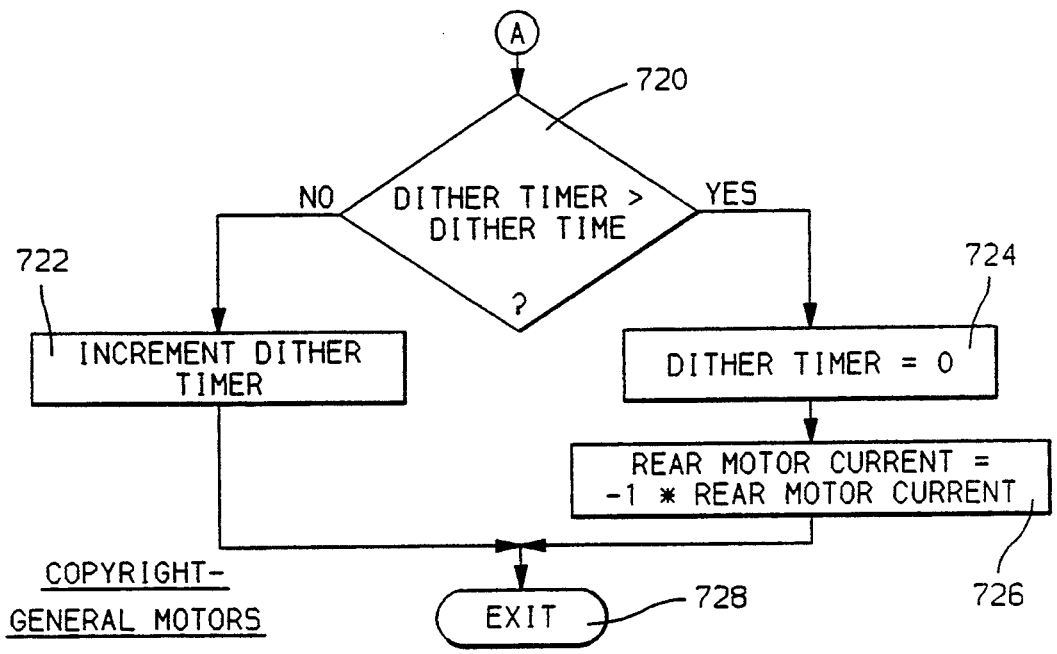

FIGS. 7a and 7b illustrate the Regulate Rear Braking subroutine used for controlling the application of the rear brakes in response to a braking request. In general the routine converts the rear desired torque command to a motor current command and applies the motor current command to the brake actuator motor.

Figure 8:
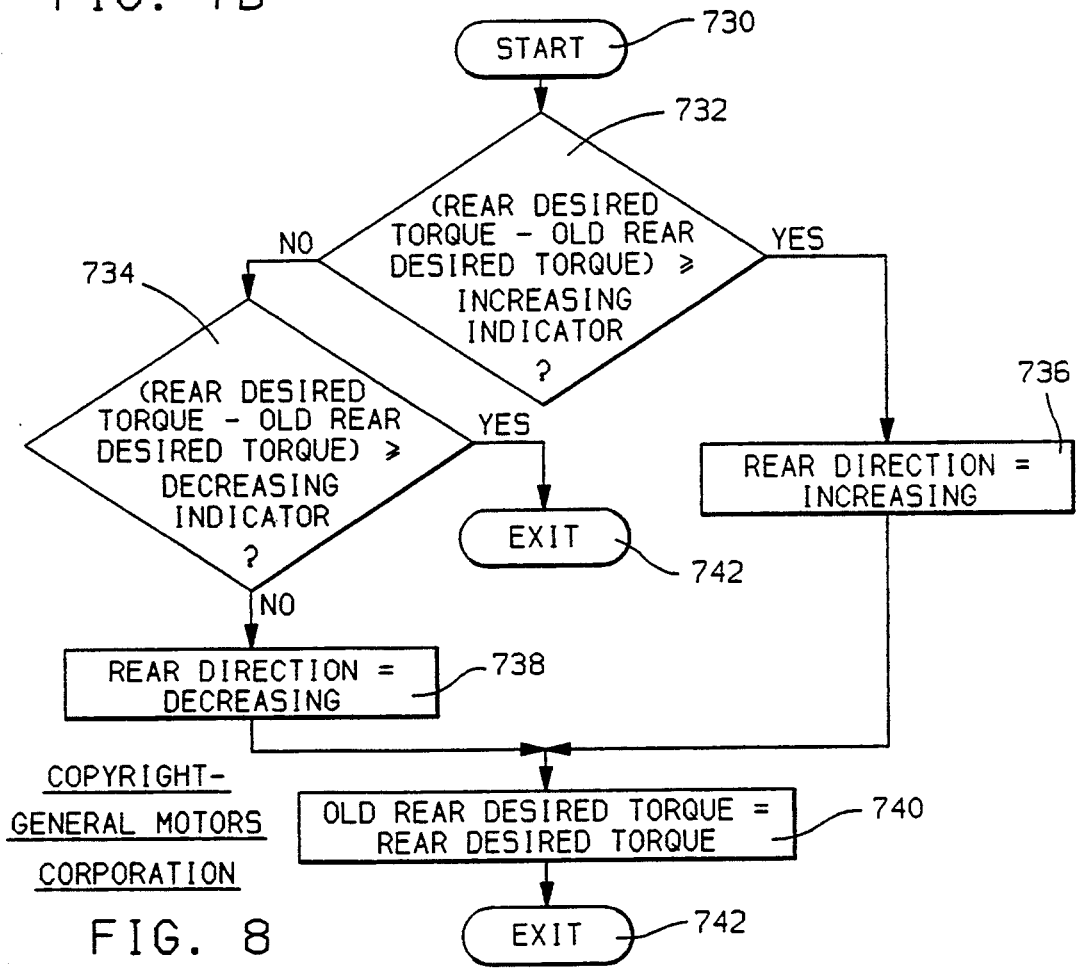

Referring to FIGS. 7a and 7b, the routine starts at block 702 and moves to block 704 where it determines if the command REAR DESIRED TORQUE is increasing or decreasing. The test performed at block 702 is illustrated in FIG. 8, starting at block 730 and moving to block 732 where it subtracts from the value REAR DESIRED TORQUE the previous value OLD REAR DESIRED TORQUE, which is the previously updated rear desired torque command. If this difference is greater than a predetermined threshold INCREASING INDICATOR (i.e., corresponding to 20 ft-lbs of torque), then it is determined that the value REAR DESIRED TORQUE is increasing and block 736 sets the flag REAR DIRECTION to INCREASING.

If at block 732, the difference is not greater than INCREASING INDICATOR, the routine moves to block 734 where the difference REAR DESIRED TORQUE−OLD REAR DESIRED TORQUE is compared to a negative threshold DECREASING INDICATOR. If the difference is greater than or equal to DECREASING INDICATOR (i.e., corresponding to −20 ft-lbs of torque), then the REAR DIRECTION flag remains at its previous value and the routine exits at block 742. If the difference is less than DECREASING INDICATOR, then it is determined that the value REAR DESIRED TORQUE is decreasing, and block 738 sets the flag REAR DIRECTION to DECREASING.

From blocks 736 or 738, the routine continues to block 740, where the value OLD REAR DESIRED TORQUE is updated equal to the value REAR DESIRED TORQUE. The routine then exits at block 742.

Referring again to FIGS. 7a and 7b, if the flag REAR DIRECTION is INCREASING, the routine moves from block 704 to block 716, where it sets the MOTOR DIRECTION flag to FORWARD. The routine then continues to block 718 where it determines the command REAR MOTOR CURRENT (which is the same as LR MOTOR CURRENT NOMINAL and RR MOTOR CURRENT NOMINAL, below) as follows:

*REAR MOTOR CURRENT=(REAR DESIRED TORQUE\*REAR FORCE TO CURRENT COEF)+REAR CURRENT OFFSET FWD*

The value REAR FORCE TO CURRENT COEF is a multiplier coefficient for converting the command REAR DESIRED TORQUE to a current command. The value REAR CURRENT OFFSET FWD is an offset value that accounts for friction in the actuator. These values will vary from implementation to implementation and are easily determined by one skilled in the art in view of the discussion herein.

If, at block 704, the value REAR DIRECTION flag is DECREASING, the routine continues to block 706 where the flag MOTOR DIRECTION is set equal to REVERSE. The routine then moves to block 708 where it performs a test to determine if enhanced commands are desired for the rear brake actuators, and sets a flag REAR MODULATION ENHANCE to either YES or NO.

The test at block 708 is only performed when the commanded rear torque (REAR DESIRED TORQUE) is decreasing. Normally, when the commanded rear torque is decreasing, the torque applied by the brakes is decreased by a predetermined ramp rate (i.e., a decrease of 2,000 ft-lbs per second) or the rate of decrease of the commanded torque, which ever is less, until the actual torque equals the commanded torque. In the motor actuator implementation, this rate of decrease is limited by the rate that the rear motor current is decreased. The test at block 708 compares the rate of decrease of the commanded rear torque as represented by the REAR DESIRED TORQUE command with the predetermined ramp rate. If the commanded rear torque is decreasing at a rate greater than the predetermined ramp rate, then an enhance mode is activated, in which the torque applied by the brakes is decreased by a rate greater than the predetermined ramp rate. In the motor actuator implementation, the enhanced rate of decrease of applied brake torque is achieved by assigning negative currents to the motor actuators, actually driving the actuators to retract, to force them to release at a faster rate. The rate of release and the commanded current depend on the desired torque being commanded. For decreases between high levels of commanded torque, the current levels applied to the motor are small, since the brake mechanism return spring provides a high amount of return force for high torque brake applications. For decreases between low levels of commanded torque, the current applied to the motor is higher, since there is not as much assist from the brake mechanism return spring.

Thus, this invention provides a method of operating a brake device to decrease applied brake torque in response to decreased commanded brake torque (a) in a first mode of operation in which, the brake torque is released at the lesser of (i) a predetermined ramp rate and (ii) the rate of decrease of the brake torque command; and (b) in a second mode of operation in which, the brake torque is released at a second predetermined ramp rate, greater than the first predetermined ramp rate, the second mode of operation selected when the rate of decrease of the brake torque command is greater than a threshold value.

According to this invention, in a brake device with a motor actuator in which forward current causes the motor to force a first friction braking surface against a second friction braking surface, with a resulting brake torque relational to the forward current and in which reverse current causes the motor retract the first friction braking surface away from the second friction braking surface, a method of decreasing the resulting brake torque in response to an operator brake command comprising: (a) a first mode of operation in which, forward current is reduced responsive to the brake command to achieve a decrease in the resulting brake torque and (b) a second mode of operation in which reverse current is applied to the motor actuator to achieve a decrease in the resulting brake torque, the second mode selected when the brake command is reduced as a rate greater than a predetermined threshold.

Figure 9:
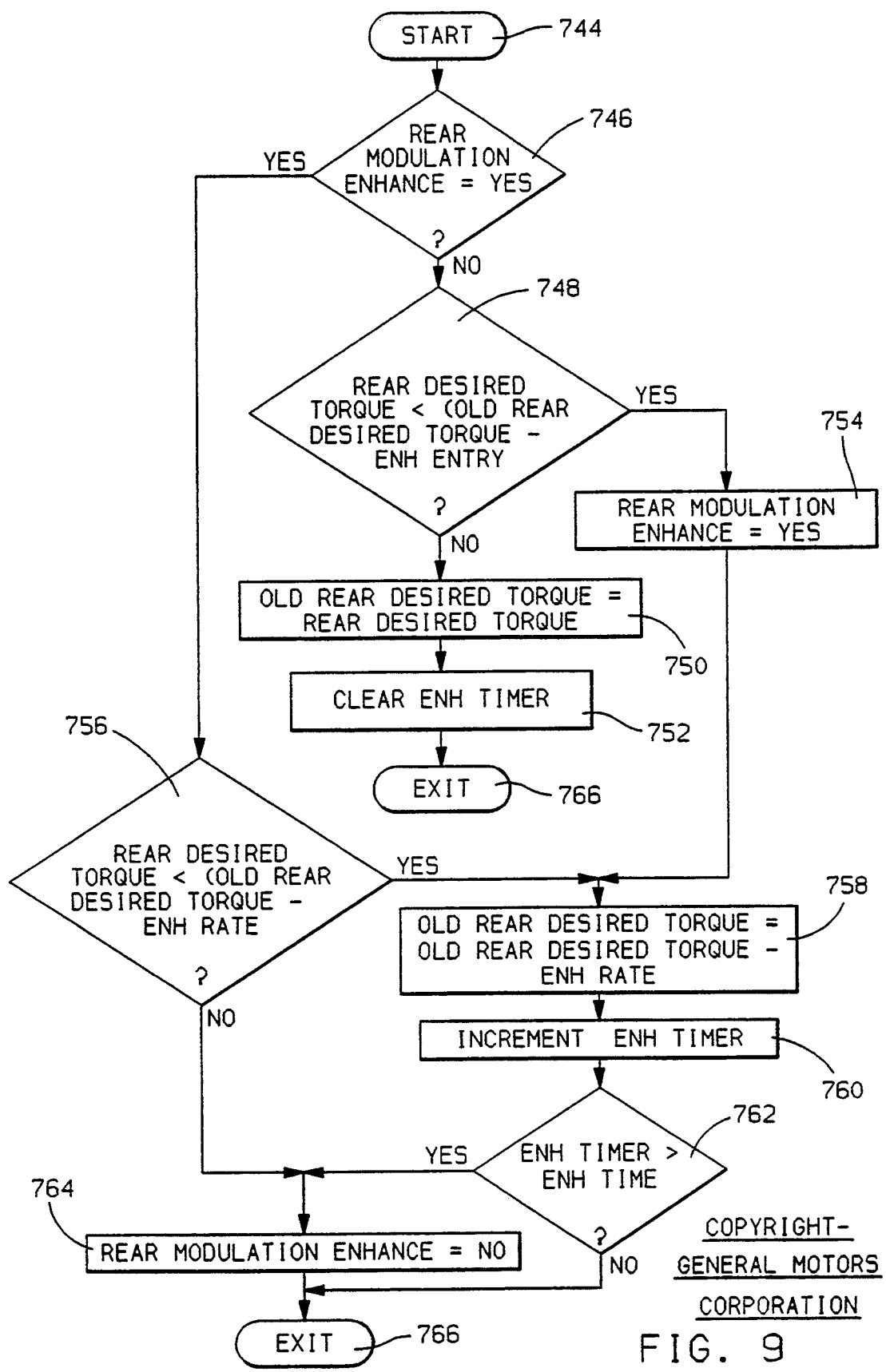

The test at block 708 is illustrated in FIG. 9 and starts at block 744 and moves to block 746 where it checks the current status of the REAR MODULATION ENHANCE flag. At block 746, if the REAR MODULATION ENHANCE flag is YES, the routine continues to block 756 where the following comparison is made:

*REAR DESIRED TORQUE<(OLD REAR DESIRED TORQUE−ENH RATE),* where ENH RATE is a predetermined level (i.e., 11 ft lbs) that sets the condition for the routine staying in the enhanced mode. If the above condition is false, then it is no longer necessary to operate in the enhanced mode and the routine moves to block 764, where the REAR MODULATION ENHANCE flag is set to NO. The routine is then exited at block 766.

If the condition tested at block 756 is true, then the routine moves to block 758 where OLD REAR DESIRED TORQUE is updated according to:

*OLD REAR DESIRED TORQUE=OLD REAR DESIRED TORQUE−ENH RATE.*

This step updates OLD REAR DESIRED TORQUE so that the next run through the routine in FIG. 9, the enhance mode is only maintained at blocks 756 and 764 described above if the command REAR DESIRED TORQUE continues to change at a sufficient rate.

After block 758, the routine moves to block 760 where the timer ENHANCE TIMER is incremented. After block 760, the routine moves to block 762 where ENHANCE TIMER is compared to a time-out value ENHANCE TIME. If ENHANCE TIMER is greater than ENHANCE TIME, the routine moves to block 764, where the flag REAR MODULATION ENHANCE is set to NO, removing the routine from enhance mode. Otherwise, from block 762, the routine moves to block 766, where it is exited. The test at block 762 sets a limit on the amount of time that the system can be in enhance mode, limiting the amount of time that reverse current can be applied to the brake during normal (non-ABS) braking operations involving decreasing brake torque commands.

If, at block 746, the flag REAR MODULATION ENHANCE was set to NO, the routine moves to block 748 where the following condition is tested:

*REAR DESIRED TORQUE<(OLD REAR DESIRED TORQUE−ENH ENTRY),* where the value ENH ENTRY is a value (i.e. 15 ft-lbs) that sets the threshold rate for entry into the enhance mode. If the condition tested at block 748 is not true, the routine moves to block 750 where the value OLD REAR DESIRED TORQUE is updated to equal the value REAR DESIRED TORQUE. The routine then continues to block 752 where ENHANCE TIMER is reset to zero and the routine is exited at block 766.

If the condition tested at block 748 is true, the routine continues to block 754 where the flag REAR MODULATION ENHANCE is set to YES to indicate that the system is in enhance mode. The routine then continues to block 758 described above.

Referring again to FIGS. 7a and 7b, if block 708 sets the flag REAR MODULATION ENHANCE to NO, enhanced actuator commands are not desired and the routine moves to block 710, where the command REAR MOTOR CURRENT is determined as follows:

*REAR MOTOR CURRENT=(REAR DESIRED TORQUE\*REAR FORCE TO CURRENT COEF)+REAR CURRENT OFFSET REV,* where REAR CURRENT OFFSET REV is an offset value added to overcome actuator friction.

From block 710 or 718 the routine continues to block 720 where a dither is added to the motor current to prevent mechanical hang-ups in the actuator. The dither is a pulse of reverse current applied periodically to the motor, for example, every 48 milliseconds.

At block 720 the value DITHER TIMER is compared to a value DITHER TIME. If DITHER TIMER is not greater than DITHER TIME, then DITHER TIMER is incremented at block 722 and the routine is exited at block 728. If at block 720 DITHER TIMER is greater than the value DITHER TIME, the routine moves to block 724 where the value DITHER TIMER is reset to zero and to block 726 where the command REAR MOTOR CURRENT is multiplied by −1 to create the reverse current pulse. The routine is then exited at block 728.

Referring back to block 708, if the flag REAR MODULATION ENHANCE is set to YES, enhance commands are desired and the routine moves to block 712 where the command REAR MOTOR CURRENT is determined as:

*REAR MOTOR CURRENT=(REAR DESIRED TORQUE\*ENH FORCE TO CURRENT)+ENH CURRENT OFFSET,* where the value ENH FORCE TO CURRENT is a multiplier coefficient for converting the torque command to a current command for enhance mode and where the value ENH CURRENT OFFSET is the offset for the enhance mode. The values ENH FORCE TO CURRENT and ENH CURRENT OFFSET differ from the values REAR FORCE TO CURRENT and REAR CURRENT OFFSET REV in that the value ENH FORCE TO CURRENT converts the force command to a negative current, so that the brake actuator is positively driven in the direction decreasing friction force of the brake and tending to move the brake pads away from the brake drum. The value REAR FORCE TO CURRENT, always converts the command to a positive motor current, so that the actuator provides force in the direction of applying the brake shoes against the brake drum.

Figure 10:
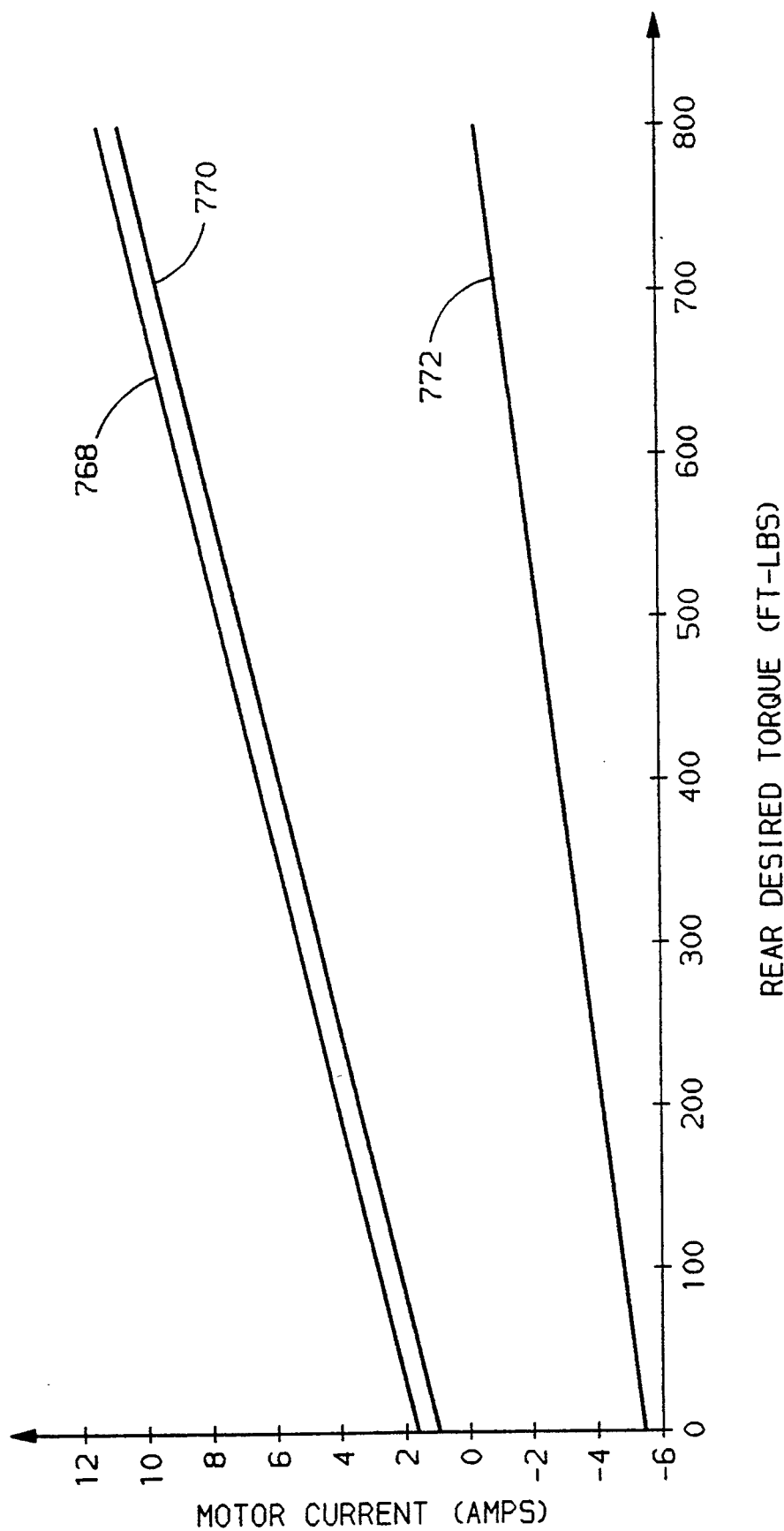
FIG. 10 graphs command to current relations for the rear brake actuator.

FIG. 10 graphs the relation between commanded torque and motor current commands determined at blocks 710, 712 and 718. Trace 768 indicates the relation between REAR DESIRED TORQUE (in ft-lbs) and REAR MOTOR CURRENT (in Amperes) for the increasing torque motor operation. Trace 770 indicates the relation between REAR DESIRED TORQUE (in ft-lbs) and REAR MOTOR CURRENT (in Amperes) for decreasing torque motor operation. The differences between traces 768 and 770 represent the amount of hysteresis in the brake actuator. Trace 772 represents the relation between REAR DESIRED TORQUE and REAR MOTOR CURRENT when the system is in enhance mode. As can be seen, trace 772 represents negative current levels compared to traces 768 and 770.

The routine moves from block 712 to block 714, where the value DITHER TIMER is set to zero, and then exits at block 728.

Figure 11:
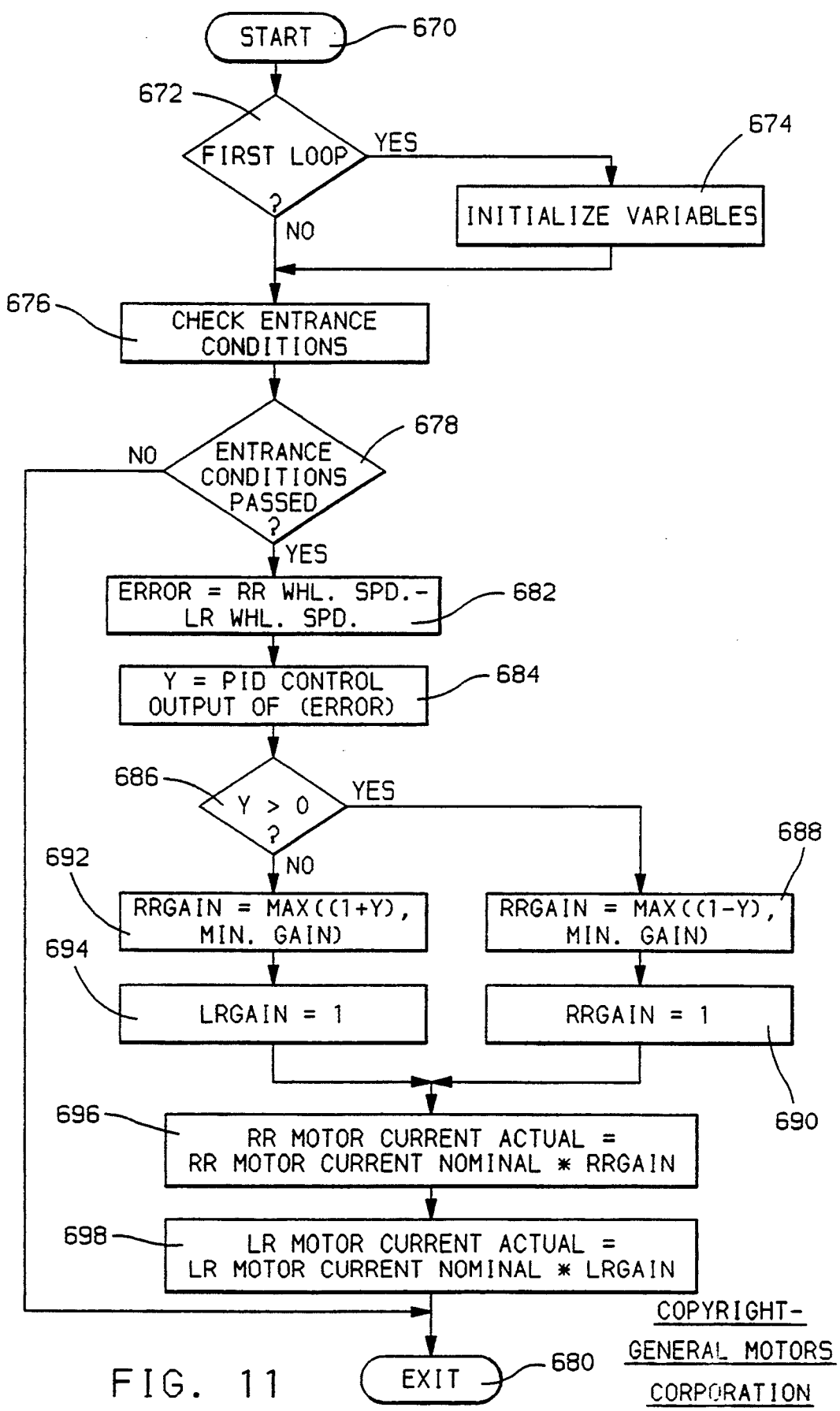
FIGS. 11, 12, 13, 14, 15, 16a, 16b, 17, 18a and 18b comprise additional flow diagrams for the example brake control flow routine according to this invention.
Figure 12:
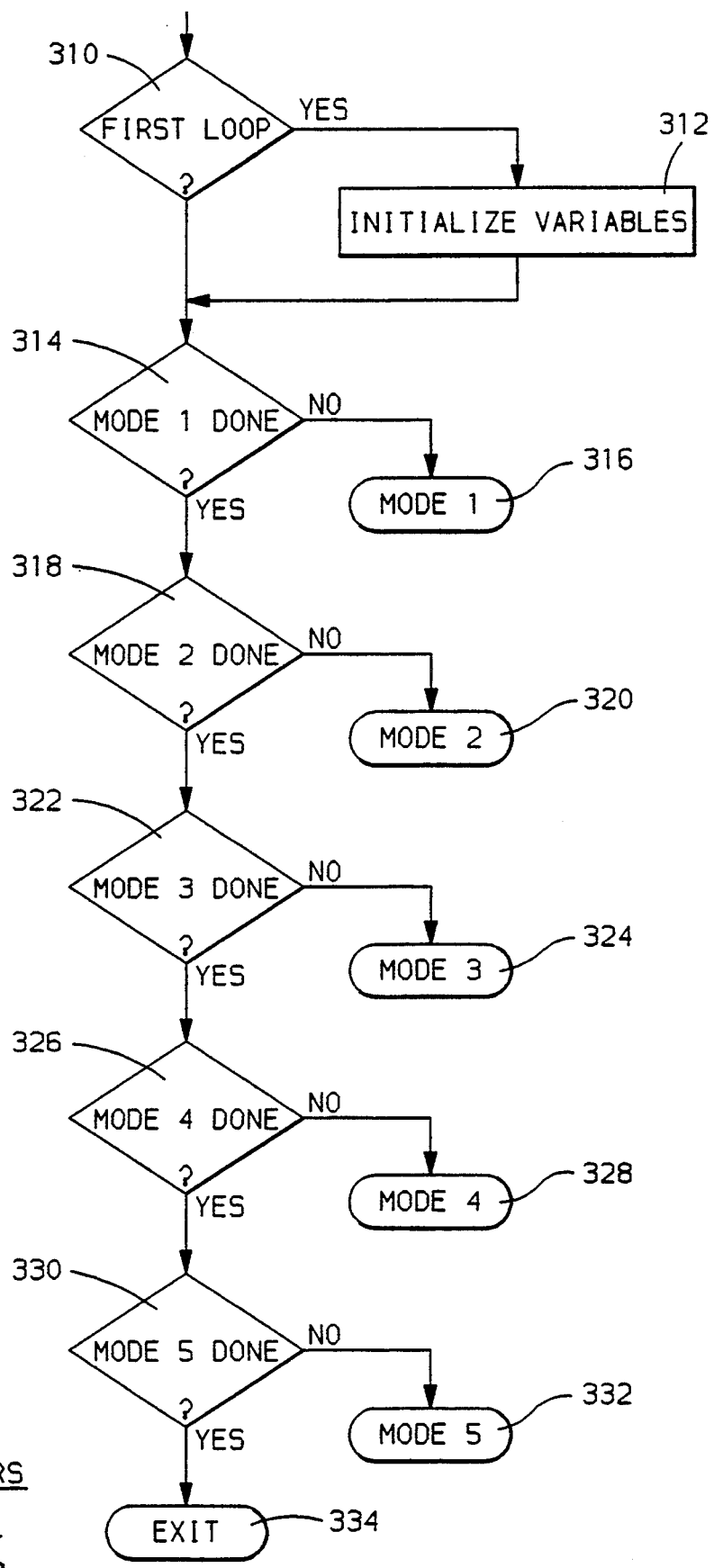

Referring now to FIG. 11, when in the REGULATION state and braking is applied, the rear brake actuator variation gains are controlled according to this invention to balance rear braking torque. This portion of the routine uses wheel speed information to adjust one of the rear brake actuator commands to reduce variations between the brake torques provided by the rear wheel brakes.

The routine shown runs only when the system is not in ABS mode and corrects for torque differences during normal braking. When any wheel on the road surface cannot provide the braking torque requested by the operator, the system goes into ABS mode and the routine shown in FIG. 11 is not run.

According to the typical braking characteristics of an automobile wheel, braking torque delivered by the wheel corresponds to the rate of deceleration of the wheel with a constant relationship from a range of zero torque until the maximum braking torque available by the wheel on the road surface is approached. Above the maximum braking torque available, the ABS system is used and the correlation between wheel deceleration rate and torque delivered no longer holds true.

During normal braking (non-ABS), wheel speed tracks wheel deceleration rate and, therefore, deceleration rate can be monitored by monitoring wheel speed. During normal non-braking driving conditions, it may be assumed that right and left wheel speeds are equal. When the brake is applied and the wheels slow down (and the system is not in ABS), wheel speeds tracks wheel speed deceleration rate. Thus, for situations in which the braking by the wheel is not approaching the maximum braking available for the road surface, wheel speed can be used as an indication of wheel braking torque.

According to this invention, when the system is not in ABS, and therefore the braking torque for the rear wheels is not approaching the maximum value, rear variation gains are controlled as shown in FIG. 11 based on rear wheel speed to maintain the rear braking torques balanced.

The routine starts at block 670 and moves to block 672 where it checks to see if this is the first loop through this routine for this braking cycle. If so, the routine moves to block 674 where the various variables are initialized. The routine continues to blocks 676 and 678 where a set of conditions is checked. The conditions checked include whether the command REAR DESIRED TORQUE is greater than a minimum value, under which the rear brakes are not operated. An example minimum value may be 120 ft-lbs of torque. If REAR DESIRED TORQUE is less than the minimum value, the routine is exited at block 680.

The test at blocks 676 and 678 also determines whether or not the vehicle is cornering. The determination of whether the vehicle is cornering may be implemented by any one of a number of known ways, including the cornering test set forth in U.S. Pat. No. 5,218,862, assigned to the assignees of this invention. If the test determines that the vehicle is cornering, the routine is exited at block 680.

The test at blocks 676 and 678 checks the ABS flag. If the system is in ABS mode, then the routine is exited at block 680.

The test at blocks 676 and 678 includes a wheel speed signal test. If any of the wheel speed signals vary from the other wheel speed signals by more than a predetermined limit, then the routine is exited at block 680. Also, if the wheel speed signals are provided by circuitry of a known type that includes diagnostics, a circuit failure, as indicated by the diagnostic function, causes the routine to exit at block 680.

If there is a parking brake request, or if the vehicle speed is below a minimum threshold (i.e., 10 MPH), the routine is exited at block 680. If the system is in enhanced command mode (block 708, FIG. 7a), then the routine is exited at block 680. If one of the rear tires has a low pressure, for example, as determined by the system described in the above-mentioned U.S. Pat. No. 5,218,862, then the routine is exited at block 680. Otherwise, the routine continues to block 682.

At block 682 a variable ERROR is determined equal to right rear wheel speed minus left rear wheel speed, as sensed by the rear wheel speed sensors. At block 684, a variable Y, the PID control output for the corresponding value of ERROR, is calculated in a known manner responsive to ERROR. Determination of the PID control output values can be easily achieved by one skilled in the art in accordance with standard PID control techniques and equations and will vary from implementation to implementation based on, the type of actuator used and the desired system performance characteristics.

At block 686, if Y is greater than zero, the routine moves to block 688 where a variable LRGAIN (left rear gain) is set equal to the maximum of 1−Y or a minimum gain value and at block 690, the variable RRGAIN (right rear gain) is set equal to 1. If Y is not greater than zero at block 686, the routine moves to block 692 where RRGAIN is set equal to the maximum of 1+Y or the minimum gain value and then to block 694 where LRGAIN is set equal to 1.

The routine then continues to block 696 where the variable RR MOTOR CURRENT ACTUAL is set equal to RR MOTOR CURRENT NOMINAL*RRGAIN. At block 698 the variable LR MOTOR CURRENT ACTUAL is set equal to LR MOTOR CURRENT NOMINAL*LRGAIN. The routine is then exited at block 680.

Thus, according to this invention as set forth herein, the rear wheel speed signals provided by the rear wheel speed sensors are used to control the gains of the right and left rear brake actuators so that variations of the brake torques provided by the right and left rear wheels are reduced. To reduce the braking torque variation provided by the two rear wheels, the wheel with the slower rotational speed has its braking reduced until both rear wheels are rotating at the same speed.

Referring now to FIGS. 12–17, when the system is in the REHOME state 638, the Home Rear Actuators subroutine is enabled by the setting of an appropriate flag. The routine starts at block 310, where it checks to determine if this is the first loop through the routine for this rehoming cycle. If yes, the routine moves to block 312 and initializes the variables. The remainder of the routine cycles through five modes of rehoming.

In the first mode, the return spring in the electric drum brake forces each brake shoe away from the drum, forcing the actuator motor to turn in the reverse direction. In the second mode, a low level of forward direction motor current is provided to slow the movement of the spring on the brake shoes. In the third mode, a reverse bump current is applied to the motor to insure that the motor is being moved in the reverse direction and that the shoes are being moved away from the drum.

In the fourth mode, the actuator is slowly retracted, moving the brake shoes away from the drum until the actuator is stopped by a mechanical stop. During this time, the system keeps track of the total work required to move the brake shoes back. This measure of total work is an indication of the distance between the brake shoes and the drums and varies with brake wear, since, as the shoe linings wear, they are less thick and the brake shoes must be moved farther forward to brake against the brake drum.

In mode 5, a motor voltage is applied in the forward direction for a time period determined by the total work calculated in mode four to move the brake shoes to within a predetermined distance from the brake drum to ready the brakes for the next braking cycle. Thus, advantageously, according to this invention, brake wear is automatically compensated for and does not affect the distance of the shoes from the brake drum after the brakes are rehomed and does not introduce time variables into rear braking performance due to brake lining wear.

Blocks 314–332 illustrate the cycling of the routine through each mode. Each mode cannot be entered unless the previous mode is completed. Each of the modes 1, 2, 3, 4 and 5 is illustrated in FIGS. 13–18b.

Figure 13:
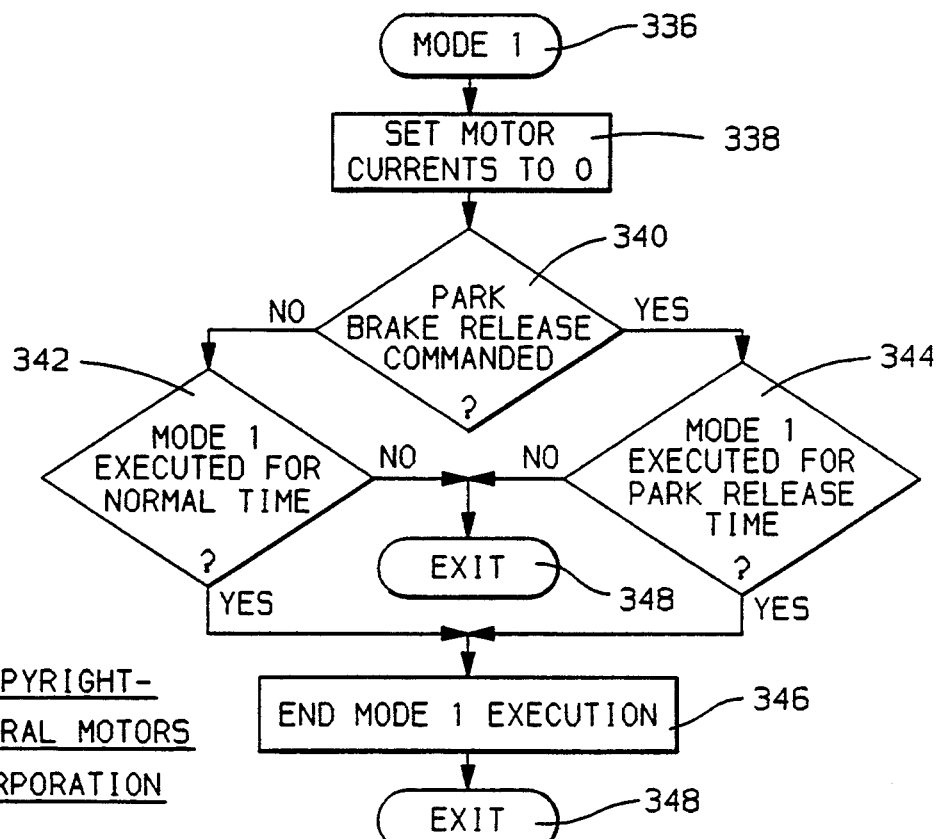

More particularly, mode 1, illustrated in FIG. 13, starts at block 338, where it sets the brake motor current commands to zero. Block 340 checks to determine if the rehoming cycle is caused by a park brake release command. This check is implemented because the mode 1 execution time is different for normal brake rehoming than for rehoming after park brake apply.

In normal brake rehoming, the routine moves to block 342 and compares a variable MODE1 TIME, representative of the execution time of mode 1, to a predetermined time limit for a normal braking mode 1 cycle. This predetermined time limit may be, for example, 72 milliseconds. If mode 1 has not been executed for the predetermined time period at block 342, the routine is exited. With each loop of the control program, the system returns to mode 1 until MODE1 TIME equals the predetermined time limit. If mode 1 has been executed for the predetermined time period, the routine moves to block 346 where an END MODE 1 execution flag is set and to block 348 where mode 1 is exited.

If the system is rehoming after a parking brake release command, the system moves to block 344 and compares the MODE1 TIME to a second predetermined time period, which corresponds to a park brake release mode 1 cycle time. If mode 1 execution time is less than the second predetermined time period, the routine is exited at block 348 and with each loop of the control program, the system returns to mode 1 until MODE1 TIME equals the second predetermined time period. Once mode 1 has been executed for the predetermined time period, the routine continues to block 346 where the END MODE 1 execution flag is set and then exits at block 348.

Figure 14:
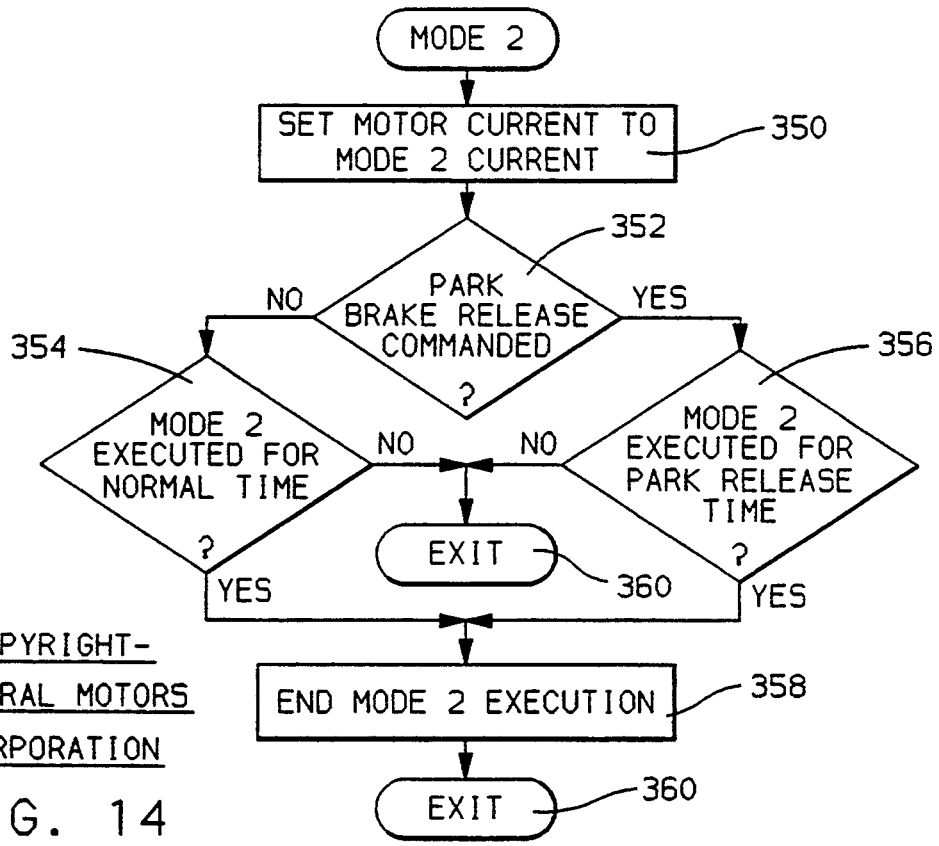

After execution of rehoming mode 1, the system enters rehoming mode 2, shown in FIG. 14. Starting at block 350, mode 2 sets the brake actuator motor current to a very low forward level, i.e., 1.2 Amps. This very low level forward direction current operates to slow the spring operation on the actuator motor so that the brake shoes retract at a predetermined rate. Block 352 checks to determine if this is a normal braking rehoming or a park brake release rehoming. For a normal rehoming, the routine moves to block 354 where it compares mode 2 execution time to a first predetermined time period (i.e., 64 ms). If mode 2 has not been executed for the first predetermined time period, the routine is exited at block 360. With each loop through the control program, the system remains in mode 2 until the mode 2 has been executed for the predetermined time period. Once mode 2 has been executed for the predetermined time period, the routine continues to block 358 where the END MODE 2 execution flag is set and exits at block 360.

For a parking brake release rehoming, block 356 compares the mode 2 execution time to a second predetermined time period for mode 2 execution during park brake release rehoming (i.e., 80 ms). If mode 2 has not been executed for the second mode 2 predetermined time period, the routine is exited at block 360. With each loop through the control program, the system remains in mode 2 until mode 2 has been executed for the second mode 2 predetermined time period. Once mode 2 has been executed for the second predetermined time period, the END MODE 2 execution flag is set at block 358 and mode 2 is exited at block 360.

Figure 15:
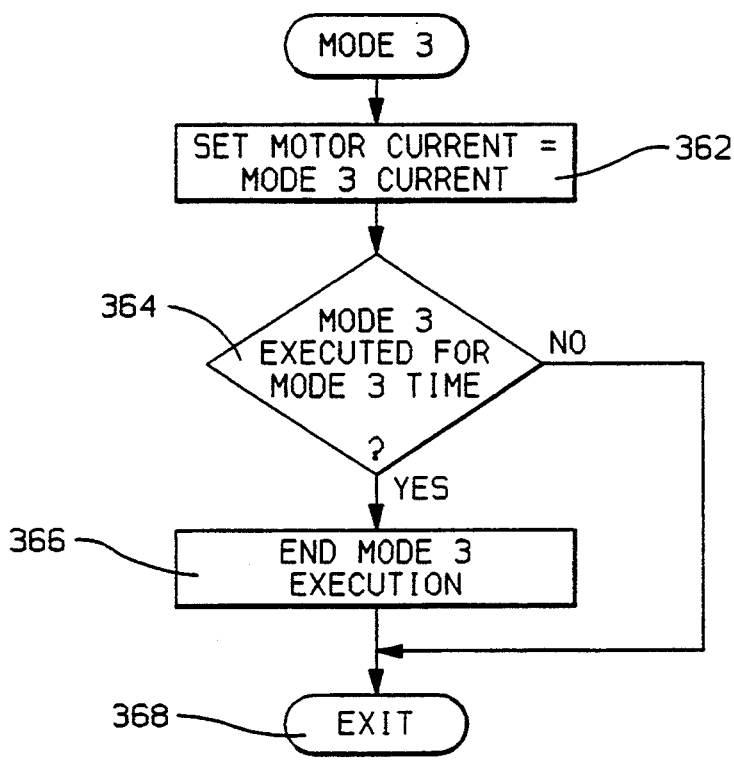

With the END MODE 2 execution flag set, the routine continues to mode 3, illustrated in FIG. 15. In mode 3, block 362 sets the motor current to a mode 3 current level, which is bump current (i.e., 4.0 Amps) that drives the actuator motor in the reverse direction for a predetermined mode 3 time period (i.e., 72 ms), which is checked at block 364. If the mode 3 current has not been applied for the mode 3 time, the routine is exited at block 368 and continued on the next loop of the control program. If mode 3 has been executed for the predetermined mode 3 time, the END MODE 3 flag is set at block 366 and the routine is exited at block 368.

The reverse current bump applied in mode 3 insures that the motor keeps moving in the reverse direction and overcomes mechanical effects, such as friction, which could stall the motor.

Figure 16A:
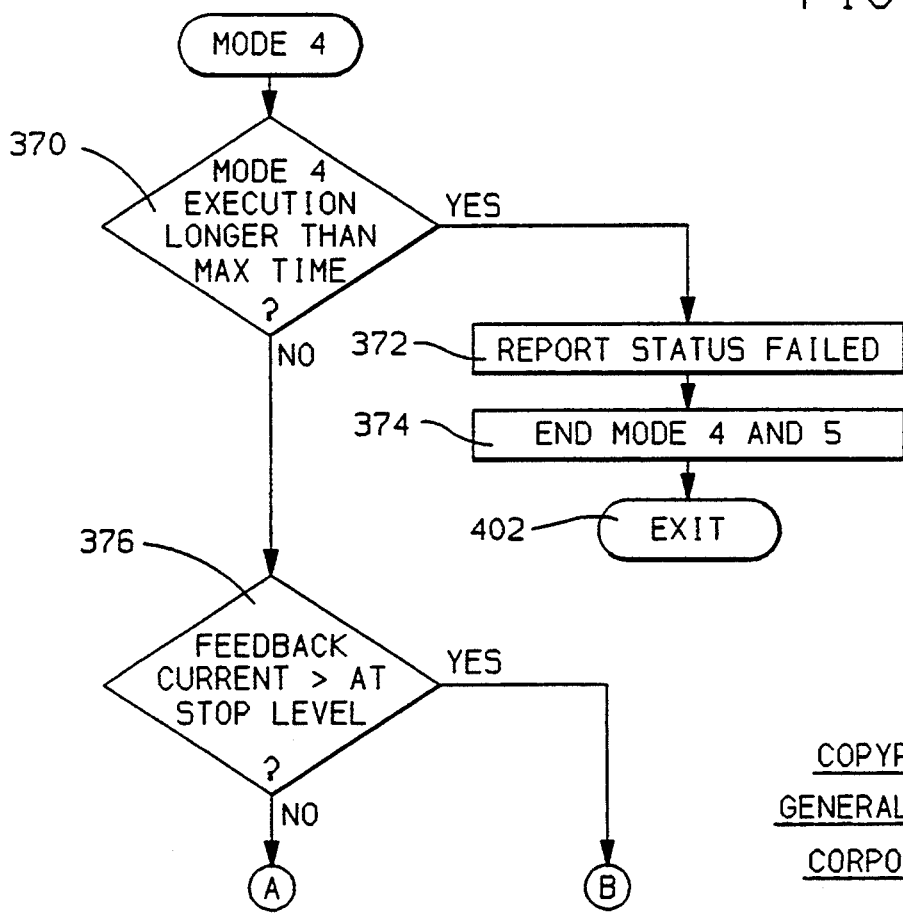
Figure 16B:
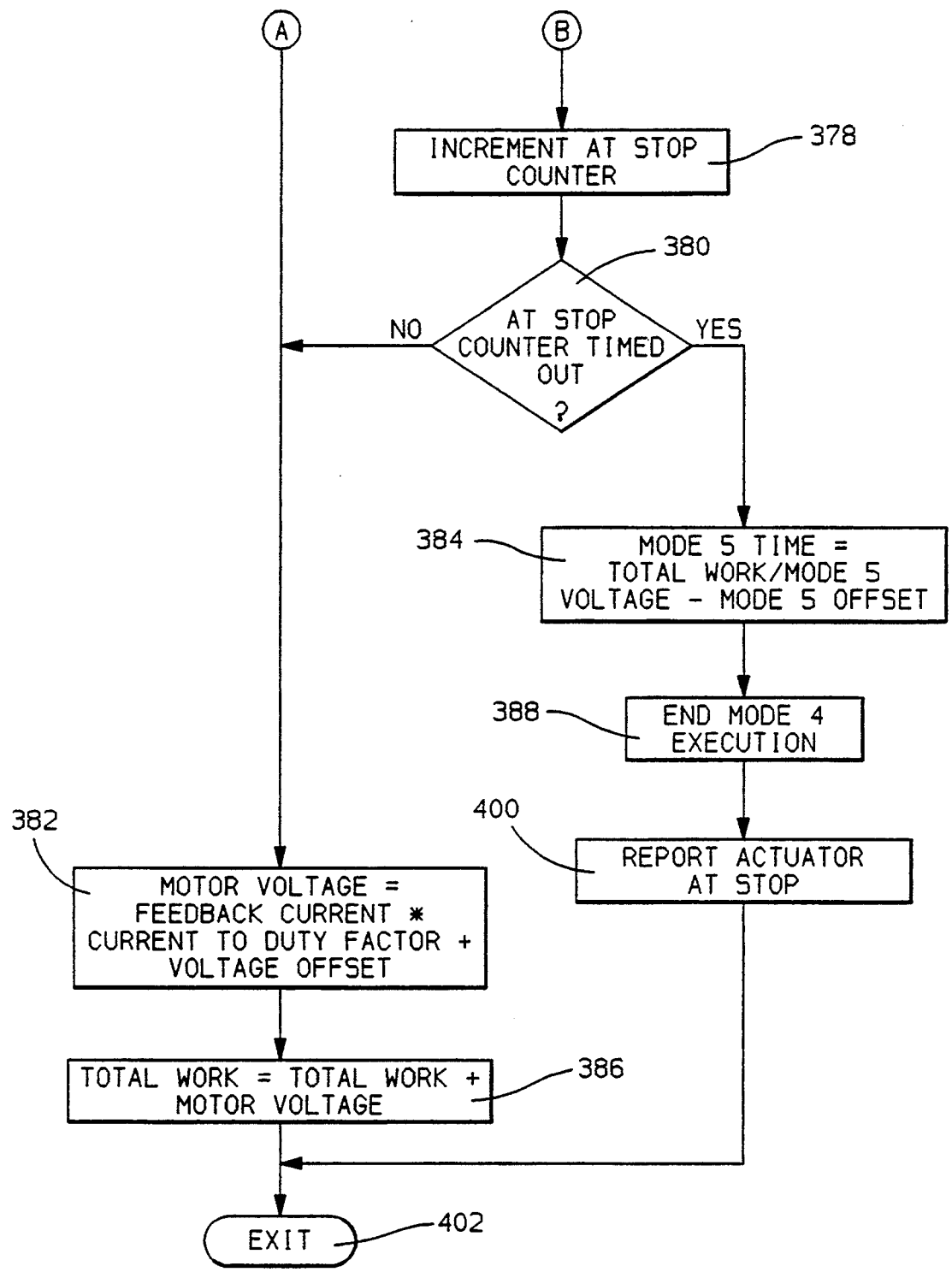
Figure 17:
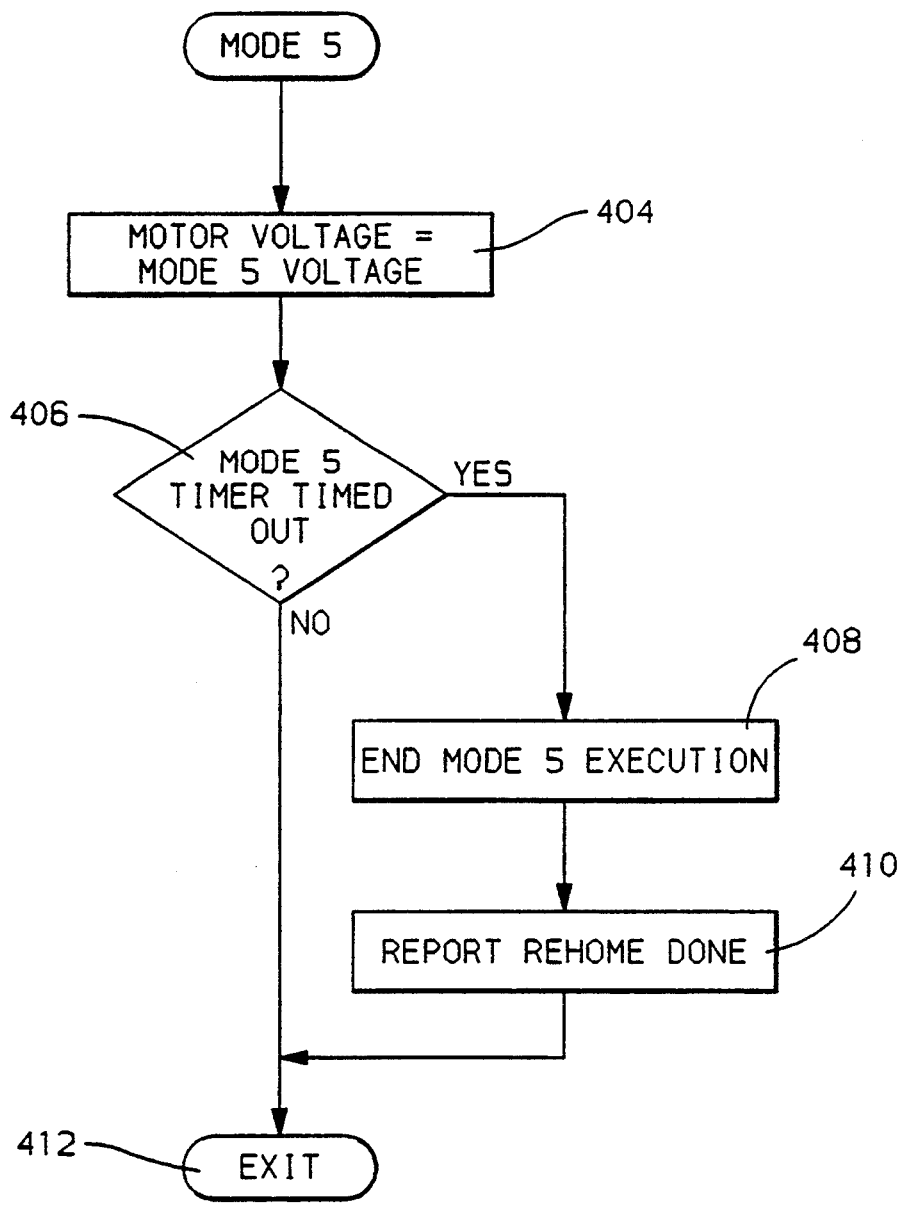
Figure 18A:
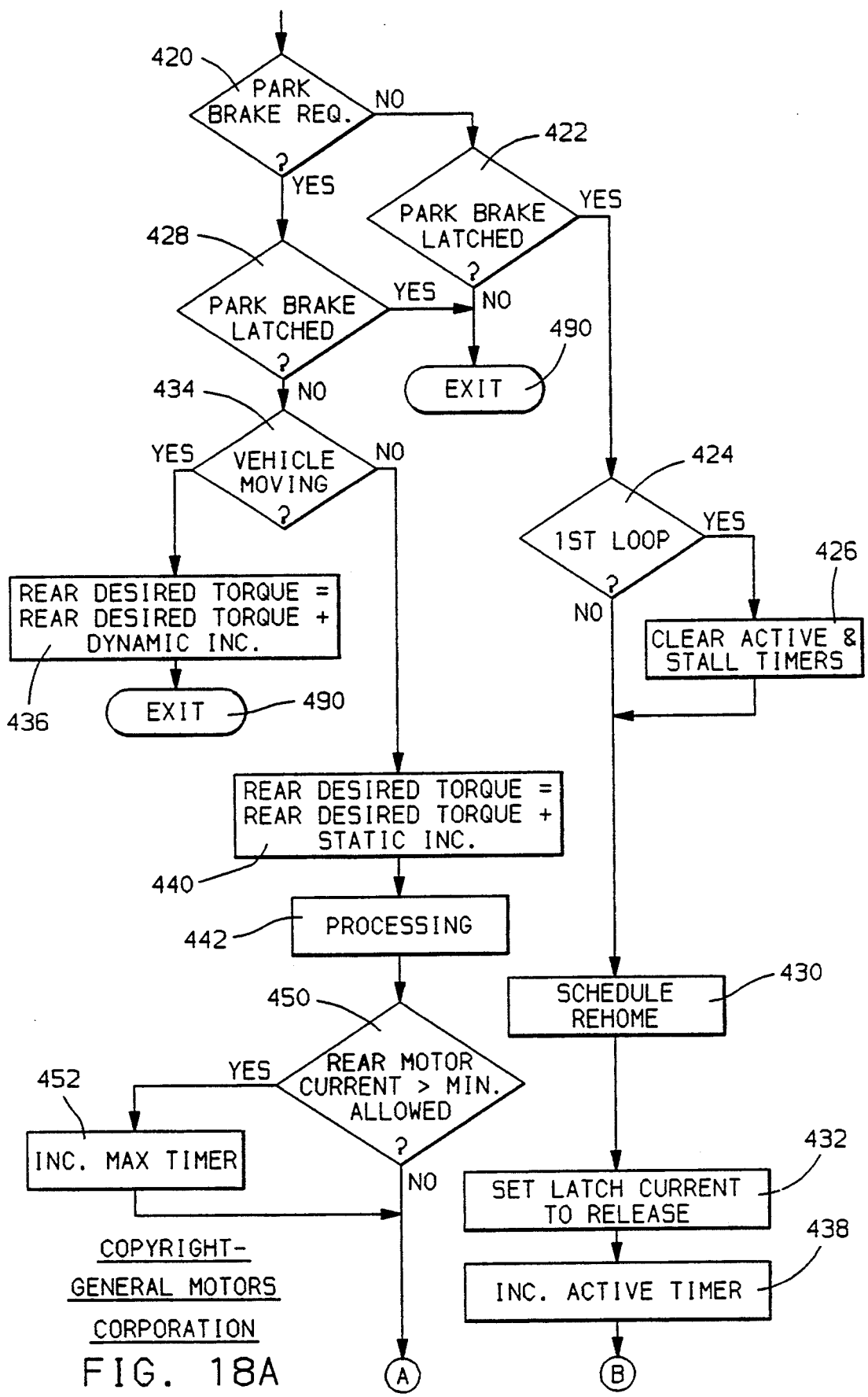
Figure 18B:
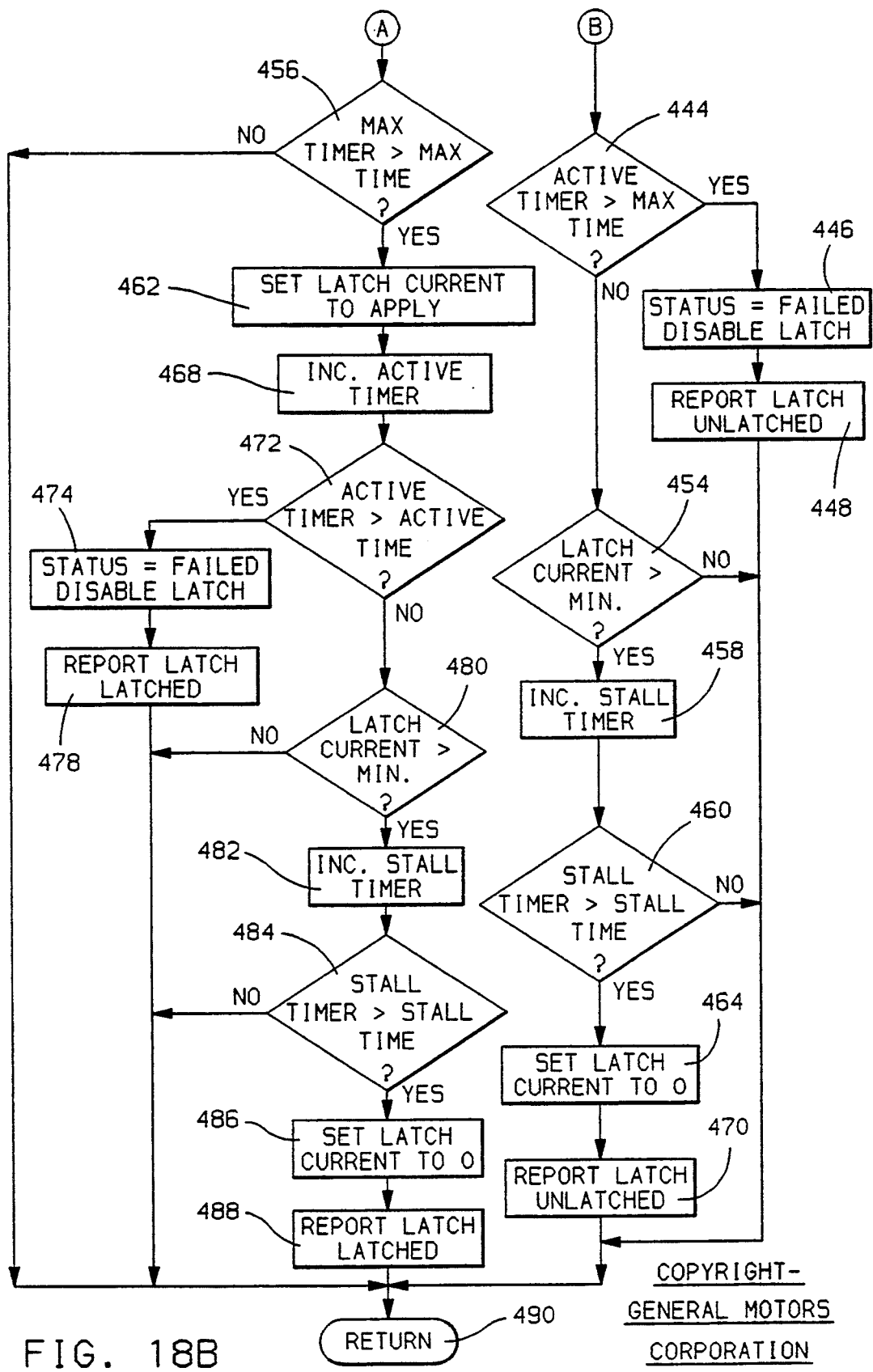

When the END MODE 3 execution flag is set, the system continues to mode 4, illustrated in FIGS. 16a and 16b. Mode 4 begins at block 370, where the routine first checks to determine if mode 4 has been executed for longer than a mode 4 maximum time period (i.e., 4 seconds). If the system has been in mode 4 for longer than the mode 4 maximum time period, there may be an error in the brake system and the routine continues to block 372 where a FAILED status flag is set. The routine then continues to block 374 where END MODE 4 and END MODE 5 flags are set and exits at block 402.

If mode 4 has not been executed for the mode 4 maximum time period, the routine continues to block 376 where it compares the measured motor feedback current to a stop level. The rear electric drum brake in the above mentioned U.S. Pat. Nos. is modified to include a mechanical stop that limits retraction (opening) of the brake shoes to a predetermined maximum-opened position. One skilled in the art can easily modify the electric drum brake to include such a mechanical stop. When the brake shoes are retracted and stop at the mechanical stop, the motor current rises since the motor is no longer able to rotate. The level the motor current rises to will be greater than the stop level programmed in the computer memory and will vary from implementation to implementation. This rise in motor current is sensed at block 376.

If the motor has not yet reached the stop, the routine continues to block 382 where the motor voltage is set to the feedback current multiplied by conversion factor for converting the sensed current to a voltage and summed with a voltage offset. In this manner, an incremental voltage is added with each loop through the program to keep the motor moving. At block 386, the total work for retracting the brake pads is set equal to the previous total work value plus the motor voltage computed at block 382. The routine is then exited at block 402.

The routine continues through blocks 382 and 386 until the brake is retracted to the stop. Once the stop is encountered and the current rises and is sensed at block 376, the routine moves to block 378 where a stop counter is incremented. At block 380 the stop counter is compared to its time out value (i.e., 48 ms). If the stop counter has not yet reached its timed out value, then the motor current is still applied and the total work is still kept track of at blocks 382 and 386.

Once the stop counter times out, the routine continues to block 384 where the mode 5 time is determined responsive to the total work kept track of at block 386 according to the equation:

$$MODE\ 5\ TIME = ((TOTAL\ WORK)/(MODE\ 5\ VOLTAGE)) - MODE\ 5\ OFFSET,$$

where MODE 5 VOLTAGE is the forward motor voltage that will be applied in mode 5 and MODE 5 OFFSET is a value used to establish the maximum clearance between the drum and shoes of the brake. At block 388, an END MODE 4 execution flag is set and at block 400 an ACTUATOR AT STOP flag is set. The routine then exits at block 402.

With the END MODE 4 execution flag set, the system continues to mode 5. Mode 5, shown in FIG. 17, starts at block 404 where the motor voltage is set to a mode 5 voltage level (i.e., 6 volts). This mode 5 voltage level is a relatively low voltage designed to move the motor and brake actuator in the forward direction, moving the brake pads to the rehomed position, which is a predetermined distance from the brake drums. Block 406 compares the execution time of mode 5 to the time period (MODE 5 TIME) determined at block 384 in FIG. 16, mode 4. Thus, the mode 5 execution time period is determined by the amount of work necessary to retract the brakes and thereby compensates for reductions in the thickness of the brake shoe lining due to aging.

Once mode 5 cycles for the time period determined at block 384 of FIG. 16, the routine continues to block 408, where an END MODE 5 execution flag is set. Block 410 then sets a REHOME DONE flag, the routine is then exited at block 412, and the Home Rear Actuators subroutine is exited at block 334, FIG. 12.

Referring now to FIGS. 5a, 5b, 18a and 18b, if the system is in the REGULATION state and the parking brake is activated, the latch control system enters LATCHING state 644 and if the system is in IDLE LATCHED state 632 and the parking brake is deactivated, the latch control system enters the UNLATCHING state 646. Either of these occurrences activates the parking brake subroutine shown in FIGS. 18a and 18b.

Starting at block 420, the routine checks to determine if a park brake request has been made. If not, the routine moves to block 422 and checks to determine if the parking brake is latched. If not, the routine is exited at block 490.

If the parking brake is not requested at block 420, but the parking brake is latched at block 422, the routine continues to the steps starting at block 424, which unlatch the parking brake. Block 424 checks to determine if this is the first loop through the unlatched operation. If yes, the two timers ACTIVE and STALL are reset at block 426. The routine then continues to block 430 where a flag is set to send the system into rehome after the parking brake is unlatched.

At block 432, the brake latch current is set to the release current level and at block 438, the time ACTIVE is incremented. If the release current is applied for a time greater than a predetermined maximum release current apply time, which is checked at block 444, the system may have an error and block 446 sets a FAILED DISABLE LATCH flag. Then at block 448, an UNLATCHED flag is set and the system is exited at block 490.

If, at block 444, the timer ACTIVE has not timed out, block 454 compares the latch current to a minimum level. If the latch current is not greater than a minimum level, the routine exits at block 490. The minimum level is a threshold current that the latch current rises above when it stalls, presumably after unlatching the brake. If the latch current is greater than the minimum level, the timer STALL is incremented at block 458 and, at block 460, the timer STALL is compared to its predetermined timed out value. If the timer STALL has not yet timed out, the routine exits at block 490 and returns to this mode with each loop through the main control routine. If the timer STALL has timed out, the routine continues to block 464 where the latch current is set to zero and then to block 470 where the UNLATCHED flat is set. The routine then exits at block 490.

If, at block 420, the parking brake is requested, block 428 determines whether the parking brake is latched. If the parking brake is latched, the routine exits at block 490.

If the parking brake is not latched, the routine continues to block 434 where it determines if the vehicle is moving. If the vehicle is moving, it is assumed that the parking brake request is made because the vehicle operator wants to implement maximum braking from the rear wheels. At block 436, the command REAR DESIRED TORQUE is updated equal to the previous rear desired torque command plus a dynamic increment. In this manner, the rear braking will ramp-up when the parking brake is requested until its maximum level, which, in the event of an ABS system, will send the system into ABS mode due to a detected wheel slip. In the event that the system does not implement ABS, the rear desired torque command is ramped up until the rear wheels lock up. After block 436, the routine exits at block 490.

If, at block 434, it is determined that the vehicle is not moving, block 440 sets the command rear desired torque equal to the previous rear desired torque command plus a static increment (i.e., 15 ft.-lbs every 8 ms). In this manner, block 440 quickly ramps-up the rear brake command when the park brake is depressed (i.e., at a rate of 1800 ft.-lbs./s). Block 442 converts the rear desired torque command to a motor current command by multiplying the rear desired torque command by a system constant. If desired, block 442 may also add other functions to the current command such as adding or subtracting a proper hysteresis offset and adding a dither to the motor current command to ensure that friction in the mechanical system does not lock-up the motor.

At block 450, the motor current is compared to a predetermined value indicative that the motor has stopped moving and that the rear brakes are fully applied. If the rear motor current is greater than this predetermined value, the routine moves to block 452 where a timer MAX is incremented. Block 456 then compares the value of MAX to its predetermined maximum value. If MAX has not yet reached its predetermined maximum value, the routine exits at block 490. If the MAX has reached its predetermined maximum value, the routine continues to block 462. In an example implementation, if the sensed rear motor current rises over 11 amps for 0.1 second, then it is assumed that the rear brakes are fully applied, and the routine can continue to block 462 where the latched current command is set to apply.

At block 468, the timer ACTIVE is incremented and at block 472 is compared to its maximum value. If the timer ACTIVE has timed out, it is assumed there is a system failure and block 474 sets a FAILED DISABLE LATCH flag. Block 478 then sets the latch flag to LATCHED and the system exits at block 490.

If at block 472 the active timer has not timed out, block 480 compares the latch current to its minimum value indicative of latch stall. When the latch current rises above a minimum value indicative of a stall, the routine continues to block 482 where a timer STALL is incremented and then to block 484 where the timer STALL is compared to its timed out value. If the timer STALL has not timed out, the routine exits at block 490 and maintains the latch current at its apply level until the timer STALL times out. When the timer STALL times out, the routine continues to block 486 where the latch current is set to zero and then to block 488 where the latch flag is set to LATCHED. The routine then exits at block 490.

The above described implementation of this invention is an example implementation and is not limiting on the scope of this invention. Moreover, various other improvements and modifications to this invention may occur to those skilled in the art and those improvements and modifications will fall within the scope of this invention as set forth below.

The embodiments of the invention in which an exclusive property or privilege is claimed are defined as follows:

1. An apparatus comprising:
   an input device for receiving a brake input;
   a brake actuator; and
   a control device coupled to the input device and the brake actuator and receiving brake commands from the input device and providing actuator commands to control current and voltage to the brake actuator, wherein, when a brake command is first received, the controller outputs, for a first predetermined time period, a brake torque command to the brake actuator commanding maximum current to the actuator, wherein, after the first predetermined time period, the controller outputs, for a second predetermined time period, a brake torque command to the brake actuator commanding voltage to the actuator responsive to the brake command and a first gain factor, and wherein after the second predetermined time period, the controller outputs the brake torque command to the brake actuator commanding current to the actuator responsive to the brake command and a second gain factor, wherein the first gain factor is greater than the second gain factor wherein brake initialization is responsive to the brake input.

2. A method of controlling a brake system comprising the steps of:
   (i) receiving a brake command from a brake pedal;
   (ii) responsive to the received command, applying full power to the brake actuator for a first time period after the brake command is received;
   (iii) after the first time period, applying power to the brake actuator responsive to the brake command and a first gain factor for a second time period;
   (iv) after the second time period, applying power to the brake actuator responsive to the brake command and a second gain factor, wherein the second gain factor is less than the first gain factor, wherein the brake actuator is initialized responsive to the brake command.

3. A method of controlling a brake system comprising the steps of:
   (i) receiving a brake command from a brake pedal;
   (ii) responsive to the received command, commanding a brake actuator to a maximum power level for a bump time period;
   (iii) after the bump time period, commanding the brake actuator to a high gain power level responsive to the brake command and a first gain factor for a duty time period; and
   (iv) after the duty time period, commanding brake actuator to a normal gain power level responsive to the brake command and a second gain factor, wherein the first gain factor is greater than the second gain factor, wherein the brake actuator is initialized responsive to the brake command, and wherein the initialization lag is minimized for hard brake applications and hard initializations are minimized for soft brake applications.

* * * * *